United States Patent
Rivard et al.

(10) Patent No.: US 10,372,971 B2
(45) Date of Patent: Aug. 6, 2019

(54) SYSTEM, METHOD, AND COMPUTER PROGRAM FOR DETERMINING AN EXPOSURE BASED ON SKIN TONE

(71) Applicant: Duelight LLC, Sunnyvale, CA (US)

(72) Inventors: William Guie Rivard, Menlo Park, CA (US); Brian J. Kindle, Sunnyvale, CA (US); Adam Barry Feder, Mountain View, CA (US)

(73) Assignee: DUELIGHT LLC, Sunnyvale, CA (US)

( * ) Notice: Subject to any disclaimer, the term of this patent is extended or adjusted under 35 U.S.C. 154(b) by 0 days.

(21) Appl. No.: 16/215,351

(22) Filed: Dec. 10, 2018

(65) Prior Publication Data

US 2019/0108388 A1    Apr. 11, 2019

Related U.S. Application Data

(63) Continuation of application No. 15/976,756, filed on May 10, 2018.

(60) Provisional application No. 62/599,940, filed on Dec. 18, 2017, provisional application No. 62/568,553, filed on Oct. 5, 2017.

(51) Int. Cl.
| | |
|---|---|
| *G06K 9/00* | (2006.01) |
| *G06K 9/62* | (2006.01) |
| *G06T 7/40* | (2017.01) |
| *G06T 7/50* | (2017.01) |
| *G06T 17/20* | (2006.01) |

(52) U.S. Cl.
CPC ....... *G06K 9/00268* (2013.01); *G06K 9/6212* (2013.01); *G06T 7/40* (2013.01); *G06T 7/50* (2017.01); *G06T 17/20* (2013.01); *G06T 2207/30201* (2013.01)

(58) Field of Classification Search
None
See application file for complete search history.

(56) References Cited

U.S. PATENT DOCUMENTS

| | | |
|---|---|---|
| 4,873,561 A | 10/1989 | Wen |
| 5,200,828 A | 4/1993 | Jang et al. |
| 5,363,209 A | 11/1994 | Eschbach et al. |
| 5,818,977 A | 10/1998 | Tansley |
| 5,867,215 A | 2/1999 | Kaplan |

(Continued)

FOREIGN PATENT DOCUMENTS

| | | |
|---|---|---|
| CN | 204316606 U | 5/2015 |
| CN | 105026955 A | 11/2015 |

(Continued)

OTHER PUBLICATIONS

Rivard et al., U.S. Appl. No. 14/823,993, filed Aug. 11, 2015.

(Continued)

*Primary Examiner* — Idowu O Osifade
(74) *Attorney, Agent, or Firm* — Zilka Kotab, PC

(57) ABSTRACT

A system and method are provided for capturing an image with correct skin tone exposure. In use, one or more faces are detected having threshold skin tone within a scene. Next, based on the detected one or more faces, the scene is segmented into one or more face regions and one or more non-face regions. Next, one or more images of the scene are captured. Further, in response to the capture, the one or more face regions are processed to generate a final image.

19 Claims, 17 Drawing Sheets

(56) References Cited

U.S. PATENT DOCUMENTS

| | | |
|---|---|---|
| 6,115,065 A | 9/2000 | Yadid-Pecht et al. |
| 6,184,940 B1 | 2/2001 | Sano |
| 6,243,430 B1 | 6/2001 | Mathe |
| 6,365,950 B1 | 4/2002 | Sohn |
| 6,453,068 B1 | 9/2002 | Li |
| 6,498,926 B1 | 12/2002 | Ciccarelli et al. |
| 6,642,962 B1 | 11/2003 | Lin et al. |
| 6,788,338 B1 | 9/2004 | Dinev et al. |
| 6,996,186 B2 | 2/2006 | Ngai et al. |
| 7,084,905 B1 | 8/2006 | Nayar et al. |
| 7,088,351 B2 | 8/2006 | Wang |
| 7,098,952 B2 | 8/2006 | Morris et al. |
| 7,206,449 B2 | 4/2007 | Raskar et al. |
| 7,256,381 B2 | 8/2007 | Asaba |
| 7,265,784 B1 | 9/2007 | Frank |
| 7,518,645 B2 | 4/2009 | Farrier |
| 7,587,099 B2 | 9/2009 | Szeliski et al. |
| 7,599,569 B2 | 10/2009 | Smirnov et al. |
| 7,760,246 B2 | 7/2010 | Dalton et al. |
| 7,835,586 B2 | 11/2010 | Porikli |
| 7,907,791 B2 | 3/2011 | Kinrot et al. |
| 7,999,858 B2 | 8/2011 | Nayar et al. |
| 8,144,253 B2 | 3/2012 | Su et al. |
| 8,189,944 B1 | 5/2012 | Lim |
| 8,610,789 B1 | 12/2013 | Nayar et al. |
| 8,723,284 B1 | 5/2014 | Hynecek |
| 8,761,245 B2 | 6/2014 | Puri et al. |
| 8,780,420 B1 | 7/2014 | Bluzer et al. |
| 8,811,757 B2 | 8/2014 | Batur |
| 8,854,421 B2 | 10/2014 | Kasahara |
| 8,878,963 B2 | 11/2014 | Prabhudesai et al. |
| 8,934,029 B2 | 1/2015 | Nayar et al. |
| 8,976,264 B2 | 3/2015 | Rivard et al. |
| 9,014,459 B2 | 4/2015 | Xiang et al. |
| 9,070,185 B2 | 6/2015 | Lee et al. |
| 9,083,905 B2 | 7/2015 | Wan et al. |
| 9,106,888 B2 | 8/2015 | Chou |
| 9,137,455 B1 | 9/2015 | Rivard et al. |
| 9,154,708 B1 | 10/2015 | Rivard et al. |
| 9,160,936 B1 | 10/2015 | Rivard et al. |
| 9,167,169 B1 | 10/2015 | Rivard et al. |
| 9,179,062 B1 | 11/2015 | Rivard et al. |
| 9,179,085 B1 | 11/2015 | Rivard et al. |
| 9,336,574 B2 | 5/2016 | Zhang et al. |
| 9,406,147 B2 | 8/2016 | Rivard et al. |
| 9,531,961 B2 | 12/2016 | Rivard et al. |
| 9,560,269 B2 | 1/2017 | Baldwin |
| 9,578,211 B2 | 2/2017 | Kong et al. |
| 9,600,741 B1 | 3/2017 | Su et al. |
| 9,661,327 B2 | 5/2017 | Nilsson |
| 9,807,322 B2 | 10/2017 | Feder et al. |
| 9,819,849 B1 | 11/2017 | Rivard et al. |
| 9,860,461 B2 | 1/2018 | Feder et al. |
| 9,912,928 B2 | 3/2018 | Rivard et al. |
| 9,918,017 B2 | 3/2018 | Rivard et al. |
| 9,998,721 B2 | 6/2018 | Rivard et al. |
| 10,110,870 B2 | 10/2018 | Rivard et al. |
| 10,129,514 B2 | 11/2018 | Rivard et al. |
| 10,178,300 B2 | 1/2019 | Rivard et al. |
| 10,182,197 B2 | 1/2019 | Feder et al. |
| 2003/0015645 A1 | 1/2003 | Brickell et al. |
| 2003/0142745 A1 | 7/2003 | Osawa |
| 2004/0181375 A1 | 9/2004 | Szu et al. |
| 2004/0184677 A1 | 9/2004 | Raskar et al. |
| 2004/0252199 A1 | 12/2004 | Cheung et al. |
| 2004/0263510 A1* | 12/2004 | Marschner ............ G06T 13/40 |
| | | 345/419 |
| 2005/0088570 A1 | 4/2005 | Seo |
| 2005/0134723 A1 | 6/2005 | Lee et al. |
| 2006/0015308 A1 | 1/2006 | Marschner et al. |
| 2006/0050165 A1 | 3/2006 | Amano |
| 2006/0181614 A1 | 8/2006 | Yen et al. |
| 2006/0245014 A1 | 11/2006 | Haneda |
| 2007/0025714 A1 | 2/2007 | Shiraki |
| 2007/0025717 A1 | 2/2007 | Raskar et al. |
| 2007/0030357 A1 | 2/2007 | Levien et al. |
| 2007/0242900 A1 | 10/2007 | Chen et al. |
| 2007/0248342 A1 | 10/2007 | Tamminen et al. |
| 2007/0263106 A1 | 11/2007 | Tanaka et al. |
| 2008/0018763 A1 | 1/2008 | Sato |
| 2008/0030592 A1 | 2/2008 | Border et al. |
| 2008/0107411 A1 | 5/2008 | Hope |
| 2008/0151097 A1 | 6/2008 | Chen et al. |
| 2008/0158398 A1 | 7/2008 | Yaffe et al. |
| 2008/0170160 A1 | 7/2008 | Lukac |
| 2008/0192064 A1 | 8/2008 | Hong et al. |
| 2009/0002475 A1 | 1/2009 | Jelley et al. |
| 2009/0066782 A1 | 3/2009 | Choi et al. |
| 2009/0153245 A1 | 6/2009 | Lee |
| 2009/0175555 A1 | 7/2009 | Mahowald |
| 2009/0295941 A1 | 12/2009 | Nakajima et al. |
| 2009/0309990 A1 | 12/2009 | Levoy et al. |
| 2009/0309994 A1 | 12/2009 | Inoue |
| 2009/0322903 A1 | 12/2009 | Hashimoto et al. |
| 2010/0073499 A1 | 3/2010 | Gere |
| 2010/0118204 A1 | 5/2010 | Proca et al. |
| 2010/0165178 A1 | 7/2010 | Chou et al. |
| 2010/0165181 A1 | 7/2010 | Murakami et al. |
| 2010/0182465 A1 | 7/2010 | Okita |
| 2010/0194851 A1 | 8/2010 | Pasupaleti et al. |
| 2010/0194963 A1 | 8/2010 | Terashima |
| 2010/0201831 A1 | 8/2010 | Weinstein |
| 2010/0208099 A1 | 8/2010 | Nomura |
| 2010/0231747 A1 | 9/2010 | Yim |
| 2010/0302407 A1 | 12/2010 | Ayers et al. |
| 2011/0019051 A1 | 1/2011 | Yin et al. |
| 2011/0090385 A1 | 4/2011 | Aoyama et al. |
| 2011/0115971 A1 | 5/2011 | Furuya et al. |
| 2011/0134267 A1 | 6/2011 | Ohya |
| 2011/0150332 A1 | 6/2011 | Sibiryakov et al. |
| 2011/0194618 A1 | 8/2011 | Gish et al. |
| 2011/0242334 A1 | 10/2011 | Wilburn et al. |
| 2011/0279698 A1 | 11/2011 | Yoshikawa |
| 2011/0280541 A1 | 11/2011 | Lee |
| 2012/0002089 A1 | 1/2012 | Wang et al. |
| 2012/0008011 A1 | 1/2012 | Garcia Manchado |
| 2012/0033118 A1 | 2/2012 | Lee et al. |
| 2012/0057786 A1 | 3/2012 | Yano |
| 2012/0069213 A1 | 3/2012 | Jannard et al. |
| 2012/0154541 A1 | 6/2012 | Scott |
| 2012/0154627 A1 | 6/2012 | Rivard et al. |
| 2012/0162465 A1 | 6/2012 | Culbert et al. |
| 2012/0188392 A1 | 7/2012 | Smith |
| 2012/0206582 A1 | 8/2012 | DiCarlo et al. |
| 2012/0242844 A1 | 9/2012 | Walker et al. |
| 2012/0262600 A1 | 10/2012 | Velarde et al. |
| 2012/0274806 A1 | 11/2012 | Mori |
| 2012/0287223 A1 | 11/2012 | Zhang et al. |
| 2012/0314100 A1 | 12/2012 | Frank |
| 2013/0010075 A1 | 1/2013 | Gallagher et al. |
| 2013/0027580 A1 | 1/2013 | Olsen et al. |
| 2013/0050520 A1 | 2/2013 | Takeuchi |
| 2013/0070145 A1 | 3/2013 | Matsuyama |
| 2013/0107062 A1 | 5/2013 | Okazaki |
| 2013/0114894 A1 | 5/2013 | Yadav et al. |
| 2013/0147979 A1 | 6/2013 | McMahon et al. |
| 2013/0176458 A1 | 7/2013 | Van Dalen et al. |
| 2013/0194963 A1 | 8/2013 | Hampel |
| 2013/0223530 A1 | 8/2013 | Demos |
| 2013/0228673 A1 | 9/2013 | Hashimoto et al. |
| 2013/0235068 A1 | 9/2013 | Ubillos et al. |
| 2013/0271631 A1 | 10/2013 | Tatsuzawa et al. |
| 2013/0279584 A1 | 10/2013 | Demos |
| 2013/0293744 A1 | 11/2013 | Attar et al. |
| 2013/0301729 A1 | 11/2013 | Demos |
| 2013/0335596 A1 | 12/2013 | Demandolx et al. |
| 2013/0342526 A1 | 12/2013 | Ng et al. |
| 2013/0342740 A1 | 12/2013 | Govindarao |
| 2014/0009636 A1 | 1/2014 | Lee et al. |
| 2014/0063287 A1 | 3/2014 | Yamada |
| 2014/0063301 A1 | 3/2014 | Solhusvik |
| 2014/0098248 A1 | 4/2014 | Okazaki |
| 2014/0176757 A1 | 6/2014 | Rivard et al. |
| 2014/0184894 A1 | 7/2014 | Motta |

(56) References Cited

U.S. PATENT DOCUMENTS

| | | | |
|---|---|---|---|
| 2014/0192216 | A1 | 7/2014 | Matsumoto |
| 2014/0192267 | A1 | 7/2014 | Biswas et al. |
| 2014/0193088 | A1 | 7/2014 | Capata et al. |
| 2014/0198242 | A1 | 7/2014 | Weng et al. |
| 2014/0211852 | A1 | 7/2014 | Demos |
| 2014/0244858 | A1 | 8/2014 | Okazaki |
| 2014/0247979 | A1 | 9/2014 | Roffet et al. |
| 2014/0267869 | A1 | 9/2014 | Sawa |
| 2014/0300795 | A1 | 10/2014 | Bilcu et al. |
| 2014/0301642 | A1 | 10/2014 | Muninder |
| 2014/0354781 | A1 | 12/2014 | Matsuyama |
| 2015/0005637 | A1 | 1/2015 | Stegman et al. |
| 2015/0077581 | A1 | 3/2015 | Baltz et al. |
| 2015/0092852 | A1 | 4/2015 | Demos |
| 2015/0098651 | A1 | 4/2015 | Rivard et al. |
| 2015/0103192 | A1 | 4/2015 | Venkatraman et al. |
| 2015/0138366 | A1 | 5/2015 | Keelan et al. |
| 2015/0229819 | A1 | 8/2015 | Rivard et al. |
| 2015/0279113 | A1* | 10/2015 | Knorr .................. G06T 19/006 345/633 |
| 2015/0334318 | A1 | 11/2015 | Georgiev et al. |
| 2015/0341593 | A1 | 11/2015 | Zhang et al. |
| 2016/0028948 | A1 | 1/2016 | Omori et al. |
| 2016/0071289 | A1 | 3/2016 | Kobayashi et al. |
| 2016/0086318 | A1 | 3/2016 | Hannuksela et al. |
| 2016/0142610 | A1 | 5/2016 | Rivard et al. |
| 2016/0150147 | A1 | 5/2016 | Shioya |
| 2016/0150175 | A1 | 5/2016 | Hynecek |
| 2016/0248968 | A1 | 8/2016 | Baldwin |
| 2016/0284065 | A1 | 9/2016 | Cohen |
| 2016/0323518 | A1 | 11/2016 | Rivard et al. |
| 2016/0381304 | A9 | 12/2016 | Feder et al. |
| 2017/0048442 | A1 | 2/2017 | Cote et al. |
| 2017/0054966 | A1 | 2/2017 | Zhou et al. |
| 2017/0061234 | A1 | 3/2017 | Lim et al. |
| 2017/0061236 | A1 | 3/2017 | Pope |
| 2017/0061567 | A1 | 3/2017 | Lim et al. |
| 2017/0064192 | A1 | 3/2017 | Mori |
| 2017/0064227 | A1 | 3/2017 | Lin et al. |
| 2017/0064276 | A1 | 3/2017 | Rivard et al. |
| 2017/0070690 | A1 | 3/2017 | Feder et al. |
| 2017/0076430 | A1 | 3/2017 | Xu |
| 2017/0085785 | A1 | 3/2017 | Corcoran et al. |
| 2017/0302903 | A1 | 10/2017 | Ng et al. |
| 2017/0374336 | A1 | 12/2017 | Rivard et al. |
| 2018/0007240 | A1 | 1/2018 | Rivard et al. |
| 2018/0063409 | A1 | 3/2018 | Rivard et al. |
| 2018/0063411 | A1 | 3/2018 | Rivard et al. |
| 2018/0077367 | A1 | 3/2018 | Feder et al. |
| 2018/0160092 | A1 | 6/2018 | Rivard et al. |
| 2018/0183989 | A1 | 6/2018 | Rivard et al. |
| 2019/0045165 | A1 | 2/2019 | Rivard et al. |

FOREIGN PATENT DOCUMENTS

| | | |
|---|---|---|
| DE | 102011107844 A1 | 1/2013 |
| EP | 2346079 A1 | 7/2011 |
| GB | 2486878 A | 7/2012 |
| GB | 2487943 A | 8/2012 |
| JP | 2000278532 A | 10/2000 |
| WO | 9746001 A1 | 12/1997 |
| WO | 0237830 A2 | 5/2002 |
| WO | 2004064391 A1 | 7/2004 |
| WO | 2009074938 A2 | 6/2009 |
| WO | 2015123455 A1 | 8/2015 |
| WO | 2015173565 A1 | 11/2015 |

OTHER PUBLICATIONS

Rivard et al., U.S. Appl. No. 14/536,524, filed Nov. 7, 2014.
Notice of Allowance from U.S. Appl. No. 13/573,252, dated Oct. 22, 2014.
Non-Final Office Action from U.S. Appl. No. 13/573,252, dated Jul. 10, 2014.
Rivard, W. et al., U.S. Appl. No. 14/568,045, filed Dec. 11, 2014.
Restriction Requirement from U.S. Appl. No. 14/568,045, dated Jan. 15, 2015.
Rivard, W. et al., U.S. Appl. No. 14/534,068, filed Nov. 5, 2014.
Non-Final Office Action from U.S. Appl. No. 14/534,068, dated Feb. 17, 2015.
Feder et al., U.S. Appl. No. 13/999,678, filed Mar. 14, 2014.
Rivard, W. et al., U.S. Appl. No. 14/534,079, filed Nov. 5, 2014.
Non-Final Office Action from U.S. Appl. No. 14/534,079, dated Jan. 29, 2015.
Rivard, W. et al., U.S. Appl. No. 14/534,089, filed Nov. 5, 2014.
Non-Final Office Action from U.S. Appl. No. 14/534,089, dated Feb. 25, 2015.
Rivard, W. et al., U.S. Appl. No. 14/535,274, filed Nov. 6, 2014.
Non-Final Office Action from U.S. Appl. No. 14/535,274, dated Feb. 3, 2015.
Rivard, W. et al., U.S. Appl. No. 14/535,279, filed Nov. 6, 2014.
Non-Final Office Action from U.S. Appl. No. 14/535,279, dated Feb. 5, 2015.
Rivard, W. et al., U.S. Appl. No. 14/535,282, filed Nov. 6, 2014.
Non-Final Office Action from U.S. Appl. No. 14/535,282, dated Jan. 30, 2015.
Non-Final Office Action from U.S. Appl. No. 14/536,524, dated Mar. 3, 2015.
Rivard, W. et al., U.S. Appl. No. 14/536,524, filed Nov. 7, 2014.
Non-Final Office Action from U.S. Appl. No. 14/568,045, dated Mar. 24, 2015.
Rivard, W. et al., U.S. Appl. No. 14/702,549, filed May 1, 2015.
Notice of Allowance from U.S. Appl. No. 14/534,079, dated May 11, 2015.
Notice of Allowance from U.S. Appl. No. 14/535,274, dated May 26, 2015.
Notice of Allowance from U.S. Appl. No. 14/534,089, dated Jun. 23, 2015.
Notice of Allowance from U.S. Appl. No. 14/535,282, dated Jun. 23, 2015.
Notice of Allowance from U.S. Appl. No. 14/536,524, dated Jun. 29, 2015.
Notice of Allowance from U.S. Appl. No. 14/534,068, dated Jul. 29, 2015.
Notice of Allowance from U.S. Appl. No. 14/535,279, dated Aug. 31, 2015.
Final Office Action from U.S. Appl. No. 14/568,045, dated Sep. 18, 2015.
Non-Final Office Action from U.S. Appl. No. 13/999,678, dated Aug. 12, 2015.
International Search Report and Written Opinion from International Application No. PCT/US15/59348, dated Feb. 2, 2016.
International Search Report and Written Opinion from International Application No. PCT/US15/59097, dated Jan. 4, 2016.
Non-Final Office Action from U.S. Appl. No. 14/702,549, dated Jan. 25, 2016.
Final Office Action from U.S. Appl. No. 13/999,678, dated Mar. 28, 2016.
International Search Report and Written Opinion from International Application No. PCT/US2015/060476, dated Feb. 10, 2016.
Notice of Allowance from U.S. Appl. No. 14/568,045, dated Apr. 26, 2016.
International Search Report and Written Opinion from International Application No. PCT/US2015/058895, dated Apr. 11, 2016.
Notice of Allowance from U.S. Appl. No. 14/568,045, dated Jan. 12, 2016.
International Search Report and Written Opinion from International Application No. PCT/US2015/059103, dated Dec. 21, 2015.
Final Office Action from U.S. Appl. No. 14/178,305, dated May 18, 2015.
Non-Final Office Action from U.S. Appl. No. 14/178,305, dated Aug. 11, 2014.
Non-Final Office Action from U.S. Appl. No. 14/823,993, dated Jul. 28, 2016.
International Search Report and Written Opinion from International Application No. PCT/US2015/059105, dated Jul. 26, 2016.

(56) References Cited

OTHER PUBLICATIONS

Notice of Allowance from U.S. Appl. No. 14/702,549, dated Aug. 15, 2016.
International Search Report and Written Opinion from International Application No. PCT/US2015/058896, dated Aug. 26, 2016.
International Search Report and Written Opinion from International Application No. PCT/US2015/058891, dated Aug. 26, 2016.
International Search Report and Written Opinion from International Application No. PCT/US2016/050011, dated Nov. 10, 2016.
Final Office Action from U.S. Appl. No. 14/823,993, dated Feb. 10, 2017.
Non-Final Office Action from U.S. Appl. No. 15/354,935, dated Feb. 8, 2017.
Non-Final Office Action from U.S. Appl. No. 13/999,678, dated Dec. 20, 2016.
Wan et al., "CMOS Image Sensors With Multi-Bucket Pixels for Computational Photography," IEEE Journal of Solid-State Circuits, vol. 47, No. 4, Apr. 2012, pp. 1031-1042.
Notice of Allowance from U.S. Appl. No. 15/201,283, dated Mar. 23, 2017.
Chatterjee et al., "Clustering-Based Denoising With Locally Learned Dictionaries," IEEE Transactions on Image Processing, vol. 18, No. 7, Jul. 2009, pp. 1-14.
Burger et al., "Image denoising: Can plain Neural Networks compete with BM3D?," Computer Vision and Pattern Recognition (CVPR), IEEE, 2012, pp. 4321-4328.
Kervann et al., "Optimal Spatial Adaptation for Patch-Based Image Denoising," IEEE Transactions on Image Processing, vol. 15, No. 10, Oct. 2006, pp. 2866-2878.
Foi et al., "Practical Poissonian-Gaussian noise modeling and fitting for single-image raw-data," IEEE Transactions, 2007, pp. 1-18.
International Search Report and Written Opinion from PCT Application No. PCT/US17/39946, dated Sep. 25, 2017.
Notice of Allowance from U.S. Appl. No. 15/201,283, dated Jul. 19, 2017.
Notice of Allowance from U.S. Appl. No. 15/354,935, dated Aug. 23, 2017.
Notice of Allowance from U.S. Appl. No. 14/823,993, dated Oct. 31, 2017.
Notice of Allowance from U.S. Appl. No. 15/352,510, dated Oct. 17, 2017.
European Office Communication and Exam Report from European Application No. 15856814.7, dated Dec. 14, 2017.
Supplemental Notice of Allowance from U.S. Appl. No. 15/354,935, dated Dec. 1, 2017.
European Office Communication and Exam Report from European Application No. 15856267.8, dated Dec. 12, 2017.
European Office Communication and Exam Report from European Application No. 15856710.7, dated Dec. 21, 2017.
European Office Communication and Exam Report from European Application No. 15857675.1, dated Dec. 21, 2017.
European Office Communication and Exam Report from European Application No. 15856212.4, dated Dec. 15, 2017.
Non-Final Office Action from U.S. Appl. No. 15/254,964, dated Jan. 3, 2018.
Non-Final Office Action from U.S. Appl. No. 15/643,311, dated Jan. 4, 2018.
European Office Communication and Exam Report from European Application No. 15857386.5, dated Jan. 11, 2018.
Kim et al., "A CMOS Image Sensor Based on Unified Pixel Architecture With Time-Division Multiplexing Scheme for Color and Depth Image Acquisition," IEEE Journal of Solid-State Circuits, vol. 47, No. 11, Nov. 2012, pp. 2834-2845.
European Office Communication and Exam Report from European Application No. 15857748.6, dated Jan. 10, 2018.
Non-Final Office Action from U.S. Appl. No. 15/814,238, dated Feb. 8, 2018.
Non-Final Office Action for U.S. Appl. No. 15/687,278, dated Apr. 13, 2018.
Non-Final Office Action from U.S. Appl. No. 15/836,655, dated Apr. 6, 2018.
Notice of Allowance from U.S. Appl. No. 15/836,655, dated Apr. 30, 2018.
Rivard, W. et al., U.S. Appl. No. 15/891,251, filed Feb. 7, 2018.
Extended European Search Report from European Application No. 15891394.7 dated Jun. 19, 2018.
Non-Final Office Action for U.S. Appl. No. 15/885,296, dated Jun. 4, 2018.
Non-Final Office Action for U.S. Appl. No. 15/891,251, dated May 31, 2018.
Notice of Allowance from U.S. Appl. No. 15/687,278, dated Aug. 24, 2018.
Final Office Action for U.S. Appl. No. 15/643,311 dated Jul. 24, 2018.
Notice of Allowance for U.S. Appl. No. 15/885,296 dated Sep. 21, 2018.
Final Office Action for U.S. Appl. No. 15/254,964 dated Jul. 24, 2018.
Notice of Allowance for U.S. Appl. No. 15/814,238 dated Oct. 4, 2018.
Corrected Notice of Allowance for U.S. Appl. No. 15/885,296 dated Oct. 16, 2018.
Rivard et al., U.S. Appl. No. 16/154,999, filed Oct. 9, 2018.
Non-Final Office Action for U.S. Appl. No. 15/636,324, dated Oct. 18, 2018.
Notice of Allowance for U.S. Appl. No. 15/643,311, dated Oct. 31, 2018.
Corrected Notice of Allowance for U.S. Appl. No. 15/814,238 dated Nov. 13, 2018.
Final Office Action for U.S. Appl. No. 15/891,251, dated Nov. 29, 2018.
Rivard et al., U.S. Appl. No. 16/213,041, filed Dec. 7, 2018.
Non-Final Office Action for U.S. Appl. No. 16/154,999, dated Dec. 20, 2018.
Notice of Allowance for U.S. Appl. No. 15/254,964, dated Dec. 21, 2018.
Supplemental Notice of Allowance for U.S. Appl. No. 15/643,311, dated Dec. 11, 2018.
Feder et al., U.S. Appl. No. 16/217,848, filed Dec. 12, 2018.
International Preliminary Examination Report from PCT Application No. PCT/US2017/39946, dated Jan. 10, 2019.
International Preliminary Examination Report from PCT Application No. PCT/US 18/54014, dated Dec. 26, 2018.
Supplemental Notice of Allowance for U.S. Appl. No. 15/254,964, dated Feb. 1, 2019.
Rivard et al., U.S. Appl. No. 16/290,763, filed Mar. 1, 2019.
Supplemental Notice of Allowance for U.S. Appl. No. 15/254,964, dated Mar. 11, 2019.
International Search Report and Written Opinion from International Application No. PCT/US 18/54014, dated Dec. 26, 2018.
Rivard, W. et al., U.S. Appl. No. 15/976,756, filed May 10, 2018.
Final Office Action for U.S. Appl. No. 15/636,324, dated Mar. 22, 2019.

\* cited by examiner

SYSTEM, METHOD, AND COMPUTER PROGRAM FOR DETERMINING AN EXPOSURE BASED ON SKIN TONE

CROSS-REFERENCES TO RELATED APPLICATIONS

The present application is a continuation of and claims priority to U.S. patent application Ser. No. 15/976,756, titled "SYSTEM, METHOD, AND COMPUTER PROGRAM FOR CAPTURING AN IMAGE WITH CORRECT SKIN TONE EXPOSURE," filed May 10, 2018, which claims priority to U.S. Provisional Patent Application No. 62/568,553, titled "SYSTEM, METHOD, AND COMPUTER PROGRAM FOR CAPTURING AN IMAGE," filed Oct. 5, 2017, as well as U.S. Provisional Patent Application No. 62/599,940, titled "SYSTEM, METHOD, AND COMPUTER PROGRAM FOR CAPTURING AN IMAGE WITH CORRECT SKIN TONE EXPOSURE SETTINGS," filed Dec. 18, 2017, all of which are hereby incorporated by reference for all purposes.

FIELD OF THE INVENTION

The present invention relates to capturing an image, and more particularly to capturing an image with correct skin tone exposure.

BACKGROUND

Conventional photographic systems currently capture images according to scene level exposure settings, with one or more points of interest used to specify corresponding regions used to meter and/or focus the scene for capture by a photographic system. However, a certain region (or regions) may have overall intensity levels that are too dark or too light to provide sufficient contrast using conventional capture techniques, resulting in a poor quality capture of significant visual features within the region. Consequently, conventional photographic systems commonly fail to capture usable portrait images of individuals with very dark skin tone or very light skin tone because the subject's skin tone is at one extreme edge of the dynamic range for the photographic system.

There is thus a need for addressing these and/or other issues associated with the prior art.

SUMMARY

A system and method are provided for capturing an image with correct skin tone exposure. In use, one or more faces are detected having threshold skin tone within a scene. Next, based on the detected one or more faces, the scene is segmented into face regions and non-face regions. Next, one or more images of the scene are captured. Further, in response to the capture, the face regions are processed to generate a final image.

DETAILED DESCRIPTION

Figure 1A:
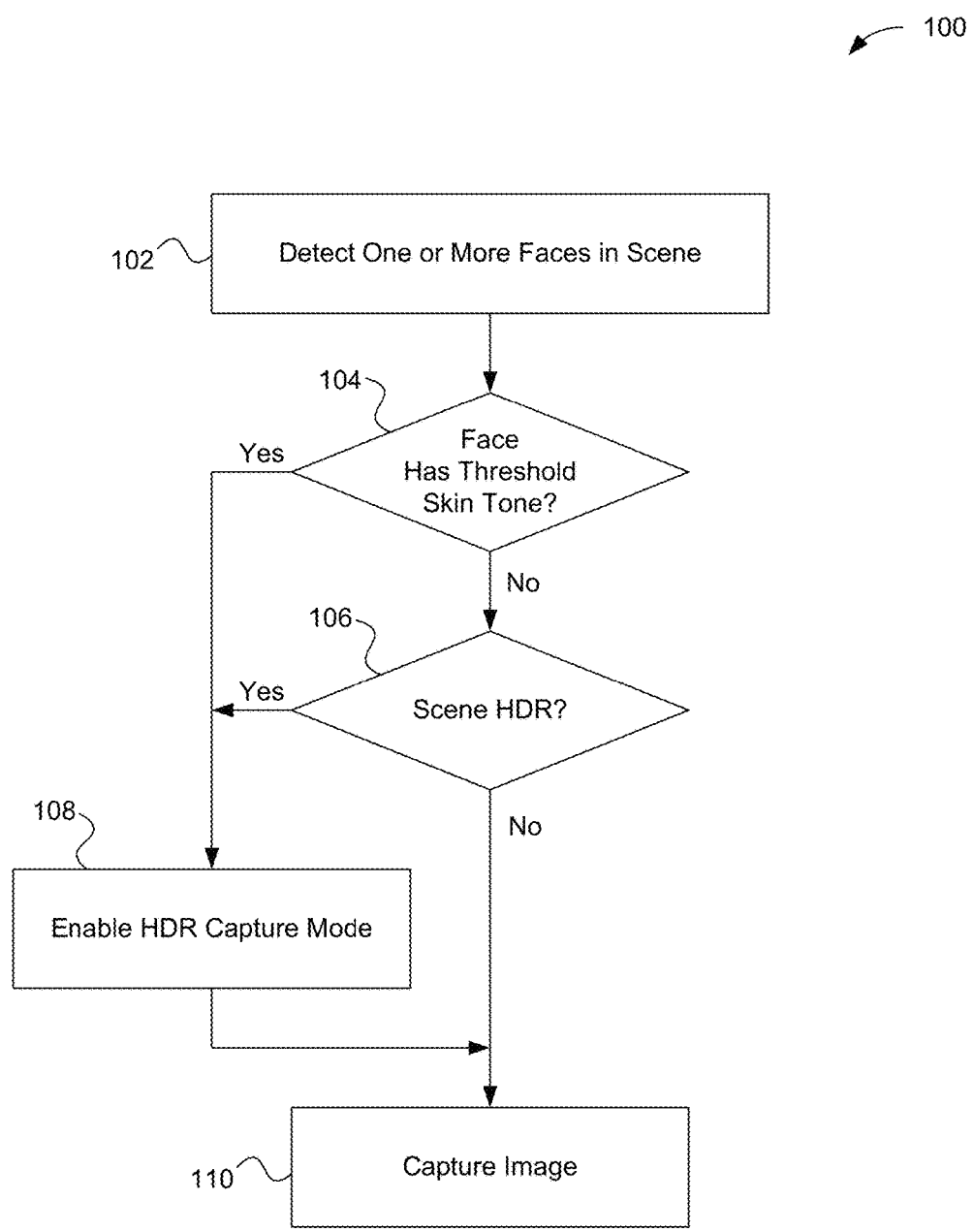
FIG. 1A illustrates a first exemplary method for capturing an image, in accordance with one possible embodiment.

FIG. 1A illustrates an exemplary method 100 for capturing an image, in accordance with one possible embodiment. Method 100 may be performed by any technically feasible digital photographic system (e.g., a digital camera or digital camera subsystem). In one embodiment, method 100 is performed by digital photographic system 300 of FIG. 3A.

At step 102, the digital photographic system detects one or more faces within a scene. It is to be appreciated that although the present description describes detecting one or more faces, one or more other body parts (e.g. arms, hands, legs, feet, chest, neck, etc.) may be detected and used within the context of method 100. Any technically feasible technique may be used to detect the one or more faces (or the one or more body parts). If, at step 104, at least one of the one or more faces (or the one or more body parts) has a threshold skin tone, then the method proceeds to step 108. In the context of the present description, skin tone refers to a shade of skin (e.g., human skin). For example, a skin tone may be light, medium, or dark, or a meld between light and medium, or medium and dark, according to a range of natural human skin colors.

If, at step 104, no face within the scene has a threshold skin tone, the method proceeds to step 106. In the context of the present description, a threshold skin tone is defined to be a dark skin tone below a defined low intensity threshold or a light skin tone above a defined intensity high threshold.

For dark skin tones, an individual's face may appear to be highly underexposed, while for light skin tones, and individual's face may appear to be washed out and overexposed. Such thresholds may be determined according to any technically feasible technique, including quantitative techniques and/or techniques using subjective assessment of captured images from a given camera system or systems.

Additionally, a threshold skin tone may include a predefined shade of skin. For example, a threshold skin tone may refer to a skin tone of light shade, medium shade, or dark shade, or a percentage of light shade and/or medium shade and/or dark shade. Such threshold skin tone may be predefined by a user, by an application, an operating system, etc. Additionally, the threshold skin tone may function in a static manner (i.e. it does not change, etc.) or in a dynamic manner. For example, a threshold skin tone may be tied to a context of the capturing device (e.g. phone, camera, etc.) and/or of the environment. In this manner, a default threshold skin tone may be applied contingent upon specific contextual or environmental conditions (e.g. brightness is of predetermined range, etc.), and if such contextual and/or environmental conditions change, the threshold skin tone may be accordingly modified. For example, a default threshold skin tone may be tied to a 'normal' condition of ambient lighting, but if the environment is changed to bright sunlight outside, the threshold skin tone may account for the brighter environment and modify the threshold skin tone.

A low threshold skin tone may be any technically feasible threshold for low-brightness appearance within a captured scene. In one embodiment, the low threshold skin tone is defined as a low average intensity (e.g., below 15% of an overall intensity range) for a region for a detected face. In another embodiment, the low threshold skin tone is defined as a low contrast for the region for the detected face. In yet another embodiment, the low threshold is defined as a low histogram median (e.g., 20% of the overall intensity range) for the region for the detected face. Similarly, a high threshold may be any technically feasible threshold for high-brightness appearance within a captured scene. In one embodiment, the high threshold is defined as a high average intensity (e.g., above 85% of an overall intensity range) for a region for a detected face. In another embodiment, the high threshold is defined as a high intensity (bright) but low contrast for the region for the detected face. In yet another embodiment, the high threshold is defined as a high histogram median (e.g., 80% of the overall intensity range) for the region for the detected face.

If, at step 106, the scene includes regions having collectively high dynamic range intensity, then the method proceeds to step 108. Otherwise, the method proceeds to step 110.

At step 108, the digital photographic system enables high dynamic range (HDR) capture. At step 110, the digital photographic system captures an image of the scene according to a capture mode. For example, if the capture mode specified that HDR is enabled, then the digital photographic system captures an HDR image.

Figure 1B:
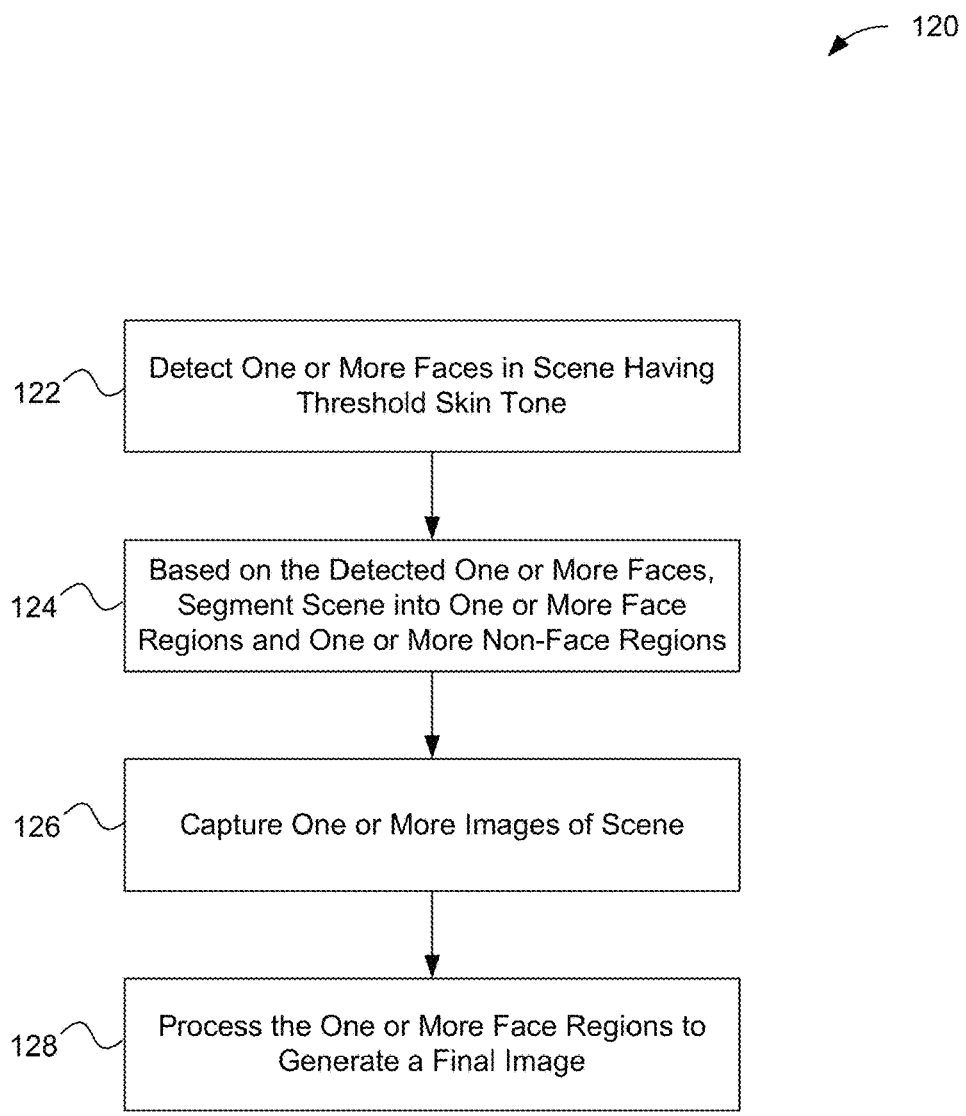
FIG. 1B illustrates a second exemplary method for capturing an image, in accordance with one possible embodiment.

FIG. 1B illustrates an exemplary method 120 for capturing an image, in accordance with one possible embodiment. Method 120 may be performed by any technically feasible digital photographic system (e.g., a digital camera or digital camera subsystem). In one embodiment, method 120 is performed by digital photographic system 300 of FIG. 3A.

At step 122, the digital photographic system detects one or more faces within a scene having threshold skin tone, as described herein. Of course, it is to be appreciated that method 120 may be applied additionally to one or more other body parts (e.g. arm, neck, chest, leg, hand, etc.).

At step 124, the digital photographic system segments the scene into one or more face region(s) and one or more non-face region(s). Any technically feasible techniques may be implemented to provide scene segmentation, including techniques that surmise coverage for a segment/region based on appearance, as well as techniques that also include a depth image (z-map) captured in conjunction with a visual image. In an alternative embodiment, step 124 may include edge detection between one part (e.g. head, etc.) and a second part (e.g. neck, etc.). In certain embodiments, machine learning techniques (e.g., a neural network classifier) may be used to detect image pixels that are part of a face region(s), or skin associated with other body parts.

At step 126, the one or more images of the scene are captured. The camera module and/or digital photographic system may be used to capture such one or more images of the scene. In one embodiment, the digital photographic system may capture a single, high dynamic range image. For example, the digital photographic system may capture a single image, which may have a dynamic range of fourteen or more bits per color channel per pixel. In another embodiment, the digital photographic system captures two or more images, each of which may provide a relatively high dynamic range (e.g., twelve or more bits per color channel per pixel) or a dynamic range of less than twelve bits per color channel per pixel. The two or more images are exposed to capture detail of at least the face region(s) and the non-face region(s). For example, a first of the two or more images may be exposed so that the median intensity of the face region(s) defines the mid-point intensity of the first image. Furthermore, a second of the two or more images may be exposed so that the median intensity of the non-face region(s) defines a mid-point intensity of the second image.

At step 128, the digital photographic system processes the one or more face regions to generate a final image. In one embodiment, to process the one or more face regions, the digital photographic system applies a high degree of HDR effect to final image pixels within the face region(s). In certain embodiments, a degree of HDR effect is tapered down for pixels along a path leading from an outside boundary of a given face region through a transition region, to a boundary of a surrounding non-face region. The transition region may have an arbitrary thickness (e.g., one pixel to many pixels). In one embodiment, the degree of HDR effect is proportional to a strength coefficient, as defined in co-pending U.S. patent application Ser. No. 14/823,993, now U.S. Pat. No. 9,918,017, filed Aug. 11, 2015, entitled "IMAGE SENSOR APPARATUS AND METHOD FOR OBTAINING MULTIPLE EXPOSURES WITH ZERO INTERFRAME TIME," which is incorporated herein by reference for all purposes. In other embodiments, other HDR techniques may be implemented, with the degree of HDR effect defined according to the particular technique. For example, a basic alpha blend may be used to blend between a conventionally exposed (ev 0) image and an HDR image, with the degree of zero HDR effect for non-face region pixels, a degree of one for face regions pixels, and a gradual transition (see FIG. 2) between one and zero for pixels within a transition region. In general, applying an HDR effect to pixels within a face region associated with an individual with a dark skin tone provides greater contrast at lower light levels and remaps the darker skin tones closer to an image intensity mid-point. Applying the HDR effect to pixels within the face region can provide greater contrast for pixels within the face region, thereby providing greater visual detail. Certain HDR techniques implement tone (intensity) mapping. In one embodiment, conventional HDR tone mapping is modified to provide greater range to pixels within the face region. For example, when capturing an image of an individual with dark skin tone, a darker captured intensity range may be mapped by the modified tone mapping to have a greater output range (final image) for pixels within the face region, while a conventional mapping is applied for pixels within the non-face region. In one embodiment, an HDR pixel stream (with correct tone mapping) may be created, as described in U.S. patent application Ser. No. 14/536,524, now U.S. Pat. No. 9,160,936, entitled "SYSTEMS AND METHODS FOR GENERATING A HIGH-DYNAMIC RANGE (HDR) PIXEL STREAM," filed Nov. 7, 2014, which is hereby incorporated by reference for all purposes. Additionally, a video stream (with correct tone mapping) may be generated by applying the methods described herein.

In another embodiment, to process the one or more images, the digital photographic system may perform a local equalization on pixels within the face region (or the selected body region). The local equalization may be applied with varying degrees within the transition region. In one embodiment, local equalization techniques, including contrast limited adaptive histogram, equalization (CLAHE) may be applied separately or in combination with an HDR technique. In such embodiments, one or more images may be captured according to method 120, or one or more images may be captured according to any other technically feasible image capture technique.

In certain embodiments, a depth map image and associated visual image(s) may be used to construct a model of one or more individuals within a scene. One or more texture maps may be generated from the visual image(s). For example, the depth map may be used, in part, to construct a three-dimensional (3D) model of an individual's face (photographic subject), while the visual image(s) may provide a surface texture for the 3D model. In one embodiment, a surface texture may include colors and/or features (e.g. moles, cuts, scars, freckles, facial fair, etc.). The surface texture may be modified to provide an average intensity that is closer to an image mid-point intensity, while preserving skin color and individually-unique skin texture (e.g. moles, cuts, scars, freckles, facial fair, etc.). The 3D model may then be rendered to generate a final image. The rendered image may include surmised natural scene lighting, natural scene lighting in combination with added synthetic illumination sources in the rendering process, or a combination thereof. For example, a soft side light may be added to provide depth cues from highlights and shadows on the individual's face. Furthermore, a gradient light may be added in the rendering process to provide additional highlights and shadows.

In certain other embodiments, techniques disclosed herein for processing face regions may be implemented as post-processing rather than in conjunction with image capture.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 1C:
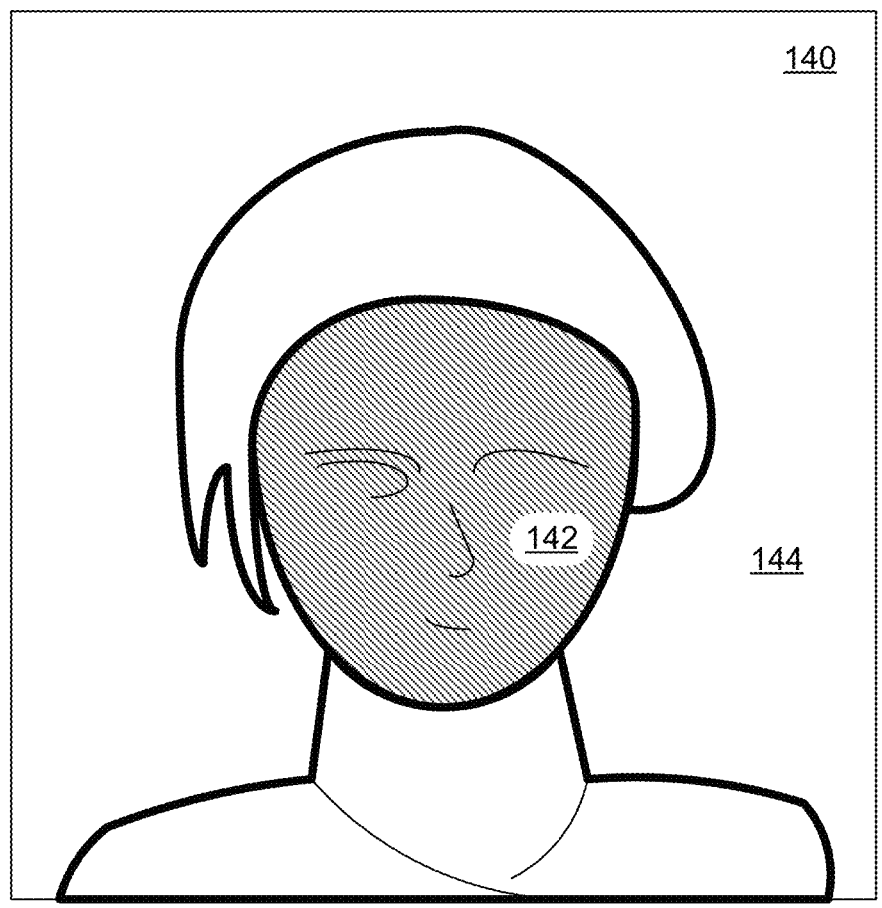
FIG. 1C illustrates an exemplary scene segmentation into a face region and non-face regions, in accordance with one possible embodiment.

FIG. 1C illustrates an exemplary scene segmentation into face region(s) 142 and non-face region(s) 144, in accordance with one possible embodiment. As shown, an image 140 is segmented into a face region 142 and a non-face region 144. Any technically feasible technique may be used to perform the scene segmentation. The technique may operate solely on visual image information, depth map information, or a combination thereof. As an option, FIG. 1C may be implemented in the context of any of the other figures, as described herein. In particular, FIG. 1C may be implemented within the context of steps 122-128 of FIG. 1B.

In another embodiment, a selected body-part region may be distinguished and separately identified from a non-selected body-part region. For example, a hand may be distinguished from the surroundings, an arm from a torso, a foot from a leg, etc.

Figure 1D:
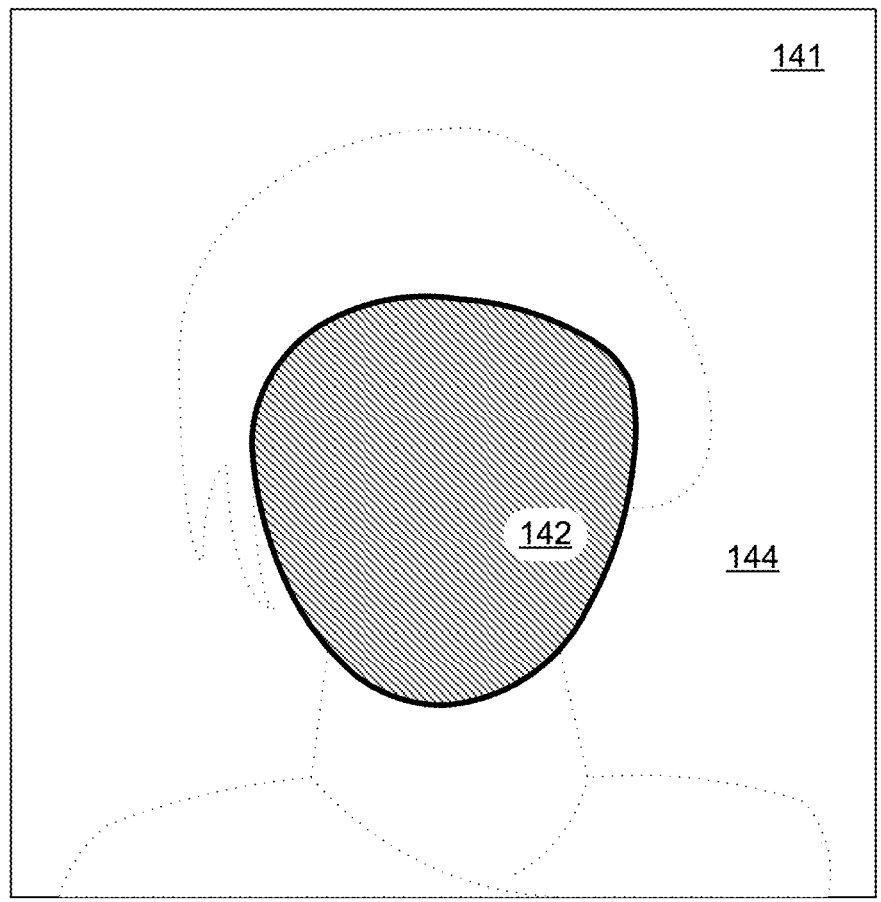
FIG. 1D illustrates a face region mask of a scene, in accordance with one possible embodiment.

FIG. 1D illustrates a face region mask 141 of a scene, in accordance with one possible embodiment. In one embodiment, a pixel value within face region mask 141 is set to a value of one (1.0) if a corresponding pixel location within image 140 is within face region 142, and a pixel value within face region mask 141 is set to a value of zero (0.0) if a corresponding pixel location within image 140 is outside face region 142. In one embodiment, a substantially complete face region mask 141 is generated and stored in memory. In another embodiment, individual mask elements are computed prior to use, without storing a complete face region mask 141 in memory. As an option, FIG. 1D may be implemented in the context of any of the other figures, as described herein. In particular, FIG. 1D may be implemented within the context of steps 122-128 of FIG. 1B, or within the context of FIG. 1C.

Figure 1E:
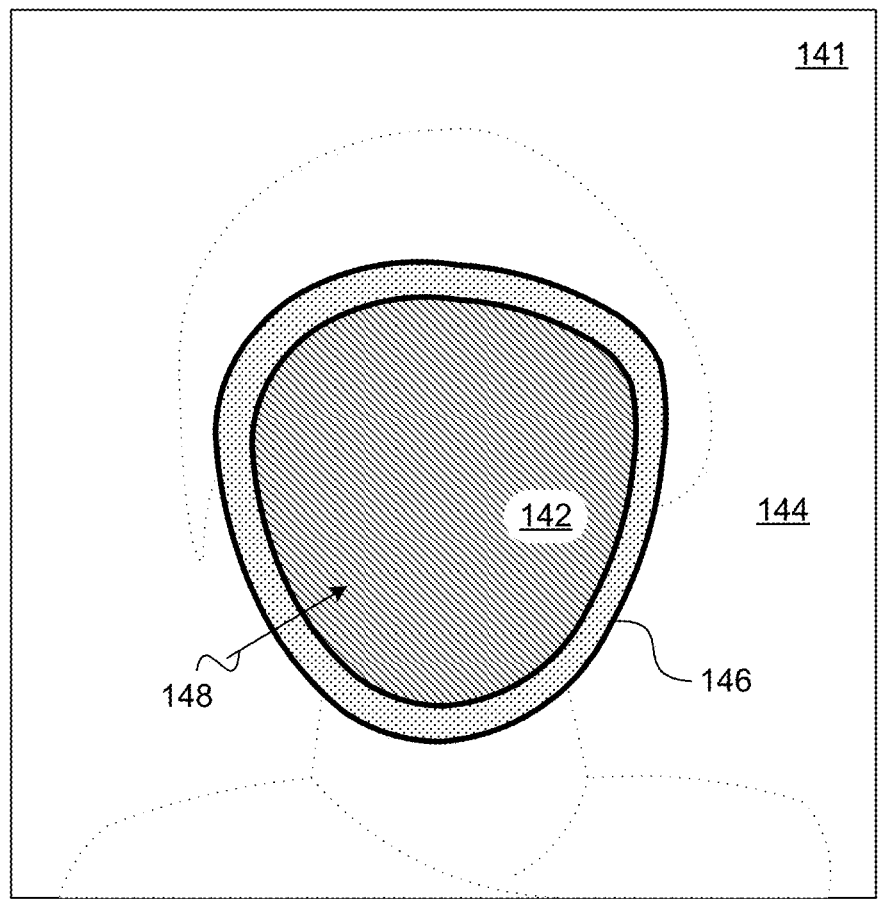
FIG. 1E illustrates a face region mask of a scene including a transition region, in accordance with one possible embodiment.

FIG. 1E illustrates a face region mask 141 of a scene including a transition region 146, in accordance with one possible embodiment. As shown, transition region 146 is disposed between face region 142 and non-face region 144. Mask values within face region mask 141 increase from zero to one along path 148 from non-face region 144 to face region 142. A gradient of increasing mask values from non-face region 144 to face region 142 is indicated along path 148. For example, a mask value may increase from a value of zero (0.0) in non-face region 144 to a value of one (1.0) in face region 142 along path 148. Any technically feasible technique may be used to generate the gradient. As an option, FIG. 1E may be implemented in the context of any of the other figures, as described herein. In particular, FIG. 1E may be implemented within the context of steps 122-128 of FIG. 1B, or within the context of FIGS. 1C-1D.

Figure 2:
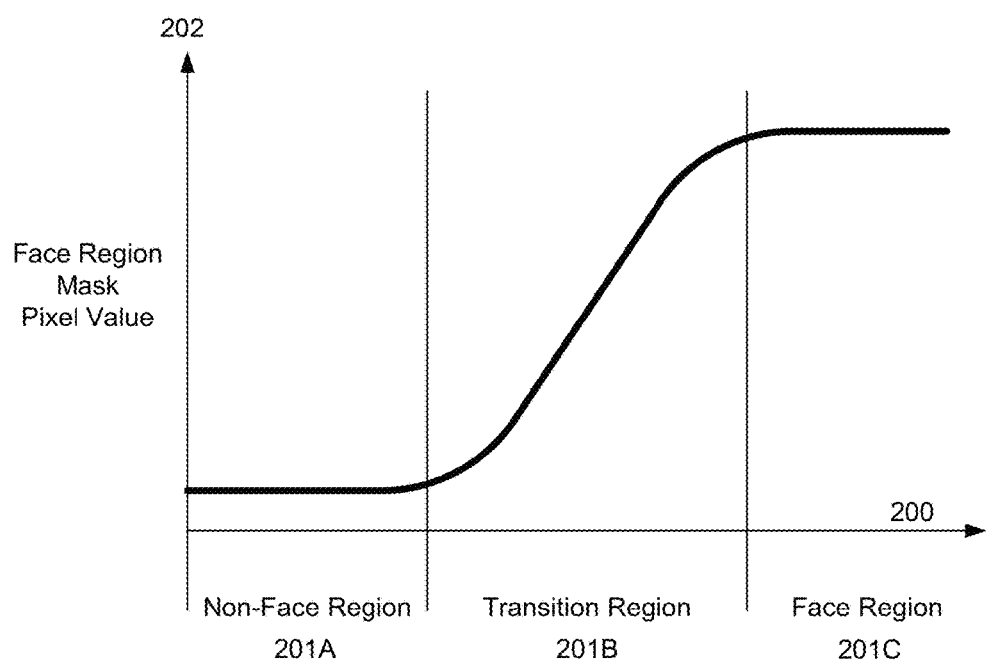
FIG. 2 illustrates an exemplary transition in mask value from a non-face region to a face region, in accordance with one possible embodiment.

FIG. 2 illustrates an exemplary transition in mask value from a non-face region (e.g., non-face region 144) to a face region (e.g., face region 142), in accordance with one possible embodiment. As an option, FIG. 2 may be implemented in the context of the details of any of the Figures disclosed herein. Of course, however, FIG. 2 may be implemented in any desired environment.

As shown, a face region mask pixel value 202 (e.g., mask value at a given pixel within face region mask 141) increases from non-face region 201A pixels to face region 201C pixels along path 200, which starts out in a non-face region 201A, traverses through a transition region 201B, and continues into a face region 201C. For example, path 200 may correspond to at least a portion of path 148 of FIG. 1E. Of course, it is to be appreciated that FIG. 2 may be implemented with respect to other and/or multiple body regions. For example, FIG. 2 may be implemented to indicate mask values that include face regions and neck regions. Furthermore, FIG. 2 may be implemented to indicate mask values that include any body part regions with skin that is visible.

In other embodiments, a depth map may be used in conjunction with, or to determine, a face region. Additionally, contrast may be modified (e.g., using CLAHE or any similar technique) to determine a skin tone. In one embodiment, if the skin tone is lighter (or darker), additional contrast may be added (or removed). In other embodiments, if the contours of a face are known (e.g., from 3D mapping of the face), lighting, shadowing, and/or other lighting effects may be added or modified in one or more post processing operations. Further, voxelization (and/or 3d mapping of 2d images) or other spatial data (e.g., a surface mesh of a subject constructed from depth map data) may be used to model a face and/or additional body parts, and otherwise determine depth values associated with an image.

In one embodiment, depth map information may be obtained from a digital camera (e.g. based on parallax calculated from more than one lens perspectives, more than one image of the same scene but from different angles an/or zoom levels, near-simultaneous capture of the image, dual pixel/focus pixel phase detection, etc.). Additionally, depth map information may also be obtained (e.g., from a depth map sensor). As an example, if a face is found in an image, and a depth map of the image is used to model the face, then synthetic lighting (e.g., a lighting gradient) could be added to the face to modify lighting conditions on the face (e.g., in real-time or in post-processing). Further, a texture map (sampled from the face in the image) may be used in conjunction with the depth map to generate a 3D model of the face. In this manner, not only can synthetic lighting be applied with correct perspective on an arbitrary face, but additionally, the lighting color may be correct for the ambient conditions and skin tone on the face (or whatever skin section is shown), according to a measured color balance for ambient lighting. Any technically feasible technique may be implemented for measuring color balance of ambient lighting, including identifying illumination sources in a scene and estimating color balance for one or more of the illumination sources. Alternatively, color balance for illumination on a subject's face may be determined based on matching sampled color to a known set of human skin tones.

In one embodiment, a texture map may be created from the face in the image. Furthermore, contrast across the texture map may be selectively modified to correct for skin tone. For example, a scene(s) may be segmented to include regions of subject skin (e.g., face) and regions that are not skin. Additionally, the scene(s) may include other skin body parts (e.g. arm, neck, etc.). In such an example, all exposed skin may be included in the texture map (either as separate texture maps or one inclusive texture map) and corrected (e.g., equalized, tone mapped, etc.) together. The corrected texture map is then applied to a 3D model of the face and any visible skin associated with visible body parts. The 3D model may then be rendered in place in a scene to generate an image of the face and any other body parts of an individual in the scene. By performing contrast correction/adjustment on visible skin of the same individual, the generated image may appear to be more natural overall because consistent skin tone is preserved for the individual.

In certain scenarios, non-contiguous regions of skin may be corrected separately. As an example, a news broadcaster may have light projected onto their face, while their neck, hands, or arms may be in shadows. Such face may therefore be very light, whereas the neck, hands, arms may all be of a separate and different hue and light intensity. As such, the scene may be segmented into several physical regions having different hue and light intensity. Each region may therefore be corrected in context for a more natural overall appearance.

In one embodiment, an object classifier and/or recognition techniques (e.g. machine learning, etc.) may be used to detect a body part (hand, arm, face, leg) and associate all body parts with exposed skin such that contrast correcting (according to the texture map) may be applied to the detected body part or parts. In one embodiment, a neural-network classification engine is configured to identify individual pixels as being affiliated with exposed skin of a body part. Pixels that are identified as being exposed skin may be aggregated into segments (regions), and the regions may be corrected (e.g., equalized, tone-mapped, etc.).

In one embodiment, a hierarchy of the scene may be built and a classification engine may be used to segment the scene. An associated texture map(s) may be generated from a scene segment(s). The texture map(s) may be corrected, rendered in place, and applied to such hierarchy. In another embodiment, the hierarchy may include extracting exposure values for each skin-exposed body part, and correlating the exposure values with a correction value based on the texture map.

In some embodiments, skin tone may be different based on the determined body part. For example, facial skin tone may differ from the hand/arm/etc. In such an embodiment, a 3D model including the texture map and the depth map, may be generated and rendered to separately correct and/or equalize pixels for one or more of each different body part. In one embodiment, a reference tone (e.g., one of a number of discrete, known human skin tones) may be used as a basis for correction (e.g., equalization, tone mapping, hue adjustment) of pixels within an image that are affiliated with exposed skin. In other embodiments, correction/skin tone may be separately applied to different, visually non-contiguous body parts.

Figure 3A:
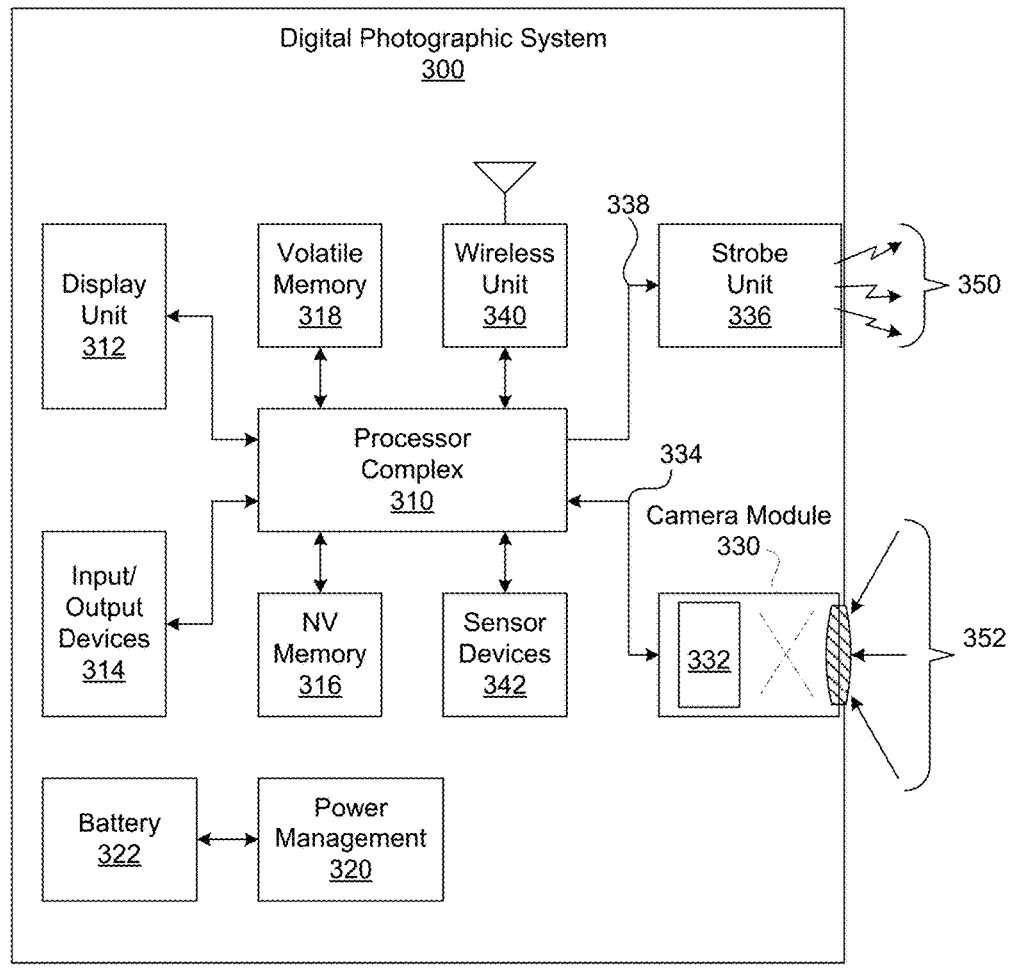
FIG. 3A illustrates a digital photographic system, in accordance with an embodiment.

FIG. 3A illustrates a digital photographic system 300, in accordance with one embodiment. As an option, the digital photographic system 300 may be implemented in the context of the details of any of the Figures disclosed herein. Of course, however, the digital photographic system 300 may be implemented in any desired environment. Further, the aforementioned definitions may equally apply to the description below.

As shown, the digital photographic system 300 may include a processor complex 310 coupled to a camera module 330 via an interconnect 334. In one embodiment, the processor complex 310 is coupled to a strobe unit 336. The digital photographic system 300 may also include, without limitation, a display unit 312, a set of input/output devices 314, non-volatile memory 316, volatile memory 318, a wireless unit 340, and sensor devices 342, each coupled to the processor complex 310. In one embodiment, a power management subsystem 320 is configured to generate appropriate power supply voltages for each electrical load element within the digital photographic system 300. A battery 322 may be configured to supply electrical energy to the power management subsystem 320. The battery 322 may implement any technically feasible energy storage system, including primary or rechargeable battery technologies. Of course, in other embodiments, additional or fewer features, units, devices, sensors, or subsystems may be included in the system.

In one embodiment, a strobe unit 336 may be integrated into the digital photographic system 300 and configured to provide strobe illumination 350 during an image sample event performed by the digital photographic system 300. In another embodiment, a strobe unit 336 may be implemented as an independent device from the digital photographic system 300 and configured to provide strobe illumination 350 during an image sample event performed by the digital photographic system 300. The strobe unit 336 may comprise one or more LED devices, a gas-discharge illuminator (e.g. a Xenon strobe device, a Xenon flash lamp, etc.), or any other technically feasible illumination device. In certain embodiments, two or more strobe units are configured to synchronously generate strobe illumination in conjunction with sampling an image. In one embodiment, the strobe unit 336 is controlled through a strobe control signal 338 to either emit the strobe illumination 350 or not emit the strobe illumination 350. The strobe control signal 338 may be implemented using any technically feasible signal transmission protocol. The strobe control signal 338 may indicate a strobe parameter (e.g. strobe intensity, strobe color, strobe time, etc.), for directing the strobe unit 336 to generate a specified intensity and/or color of the strobe illumination 350. The strobe control signal 338 may be generated by the processor complex 310, the camera module 330, or by any other technically feasible combination thereof. In one embodiment, the strobe control signal 338 is generated by a camera interface unit within the processor complex 310 and transmitted to both the strobe unit 336 and the camera module 330 via the interconnect 334. In another embodiment, the strobe control signal 338 is generated by the camera module 330 and transmitted to the strobe unit 336 via the interconnect 334.

Optical scene information 352, which may include at least a portion of the strobe illumination 350 reflected from objects in the photographic scene, is focused as an optical image onto an image sensor 332 within the camera module 330. The image sensor 332 generates an electronic representation of the optical image. The electronic representation comprises spatial color intensity information, which may include different color intensity samples (e.g. red, green, and blue light, etc.). In other embodiments, the spatial color intensity information may also include samples for white light. The electronic representation is transmitted to the processor complex 310 via the interconnect 334, which may implement any technically feasible signal transmission protocol.

In one embodiment, input/output devices 314 may include, without limitation, a capacitive touch input surface, a resistive tablet input surface, one or more buttons, one or more knobs, light-emitting devices, light detecting devices, sound emitting devices, sound detecting devices, or any other technically feasible device for receiving user input and converting the input to electrical signals, or converting electrical signals into a physical signal. In one embodiment, the input/output devices 314 include a capacitive touch input surface coupled to a display unit 312. A touch entry display system may include the display unit 312 and a capacitive touch input surface, also coupled to processor complex 310.

Additionally, in other embodiments, non-volatile (NV) memory 316 is configured to store data when power is interrupted. In one embodiment, the NV memory 316 comprises one or more flash memory devices (e.g. ROM, PCM, FeRAM, FRAM, PRAM, MRAM, NRAM, etc.). The NV memory 316 comprises a non-transitory computer-readable medium, which may be configured to include programming instructions for execution by one or more processing units within the processor complex 310. The programming instructions may implement, without limitation, an operating system (OS), UI software modules, image processing and storage software modules, one or more input/output devices 314 connected to the processor complex 310, one or more software modules for sampling an image stack through camera module 330, one or more software modules for presenting the image stack or one or more synthetic images generated from the image stack through the display unit 312. As an example, in one embodiment, the programming instructions may also implement one or more software modules for merging images or portions of images within the image stack, aligning at least portions of each image within the image stack, or a combination thereof. In another embodiment, the processor complex 310 may be configured to execute the programming instructions, which may implement one or more software modules operable to create a high dynamic range (HDR) image.

Still yet, in one embodiment, one or more memory devices comprising the NV memory 316 may be packaged as a module configured to be installed or removed by a user. In one embodiment, volatile memory 318 comprises dynamic random access memory (DRAM) configured to temporarily store programming instructions, image data such as data associated with an image stack, and the like, accessed during the course of normal operation of the digital photographic system 300. Of course, the volatile memory may be used in any manner and in association with any other input/output device 314 or sensor device 342 attached to the process complex 310.

In one embodiment, sensor devices 342 may include, without limitation, one or more of an accelerometer to detect motion and/or orientation, an electronic gyroscope to detect motion and/or orientation, a magnetic flux detector to detect orientation, a global positioning system (GPS) module to detect geographic position, or any combination thereof. Of course, other sensors, including but not limited to a motion detection sensor, a proximity sensor, an RGB light sensor, a gesture sensor, a 3-D input image sensor, a pressure sensor, and an indoor position sensor, may be integrated as sensor devices. In one embodiment, the sensor devices may be one example of input/output devices 314.

Wireless unit 340 may include one or more digital radios configured to send and receive digital data. In particular, the wireless unit 340 may implement wireless standards (e.g. WiFi, Bluetooth, NFC, etc.), and may implement digital cellular telephony standards for data communication (e.g. CDMA, 3G, 4G, 5G, LTE, LTE-Advanced, etc.). Of course, any wireless standard or digital cellular telephony standards may be used.

In one embodiment, the digital photographic system 300 is configured to transmit one or more digital photographs to a network-based (online) or "cloud-based" photographic media service via the wireless unit 340. The one or more digital photographs may reside within the NV memory 316, the volatile memory 318, or any other memory device associated with the processor complex 310. In one embodiment, a user may possess credentials to access an online photographic media service and to transmit one or more digital photographs for storage to, retrieval from, and presentation by the online photographic media service. The credentials may be stored or generated within the digital photographic system 300 prior to transmission of the digital photographs. The online photographic media service may comprise a social networking service, photograph sharing service, or any other network-based service that provides storage of digital photographs, processing of digital photographs, transmission of digital photographs, sharing of digital photographs, or any combination thereof. In certain embodiments, one or more digital photographs are generated by the online photographic media service based on image data (e.g. image stack, HDR image stack, image package, etc.) transmitted to servers associated with the online photographic media service. In such embodiments, a user may upload one or more source images from the digital photographic system 300 for processing and/or storage by the online photographic media service.

In one embodiment, the digital photographic system 300 comprises at least one instance of a camera module 330. In another embodiment, the digital photographic system 300 comprises a plurality of camera modules 330. Such an embodiment may also include at least one strobe unit 336 configured to illuminate a photographic scene, sampled as multiple views by the plurality of camera modules 330. The plurality of camera modules 330 may be configured to sample a wide angle view (e.g., greater than forty-five degrees of sweep among cameras) to generate a panoramic photograph. In one embodiment, a plurality of camera modules 330 may be configured to sample two or more narrow angle views (e.g., less than forty-five degrees of sweep among cameras) to generate a stereoscopic photograph. In other embodiments, a plurality of camera modules 330 may be configured to generate a 3-D image or to otherwise display a depth perspective (e.g. a z-component, etc.) as shown on the display unit 312 or any other display device. In still other embodiments, two or more different camera modules 330 are configured to have different optical properties, such as different optical zoom levels. In one embodiment, a first camera module 330 is configured to sense intensity at each pixel, while a second camera module 330 is configured to sense color at each pixel. In such an embodiment, pixel intensity information from the first camera module and pixel color information from the second camera module may be fused together to generate an output image. In one embodiment, a first camera module 330 with a higher zoom factor is configured to capture a central image, while at least one camera module 330 with a wider zoom factor is configured to capture a wider image; the central image and the wider image are then fused together to generate a visual image, while parallax between the central image and the wider image is used to estimate a depth image (depth map). The visual image and the depth map may be used to generate a corrected portrait image according to the techniques disclosed herein.

In one embodiment, a display unit 312 may be configured to display a two-dimensional array of pixels to form an image for display. The display unit 312 may comprise a liquid-crystal (LCD) display, a light-emitting diode (LED) display, an organic LED display, or any other technically feasible type of display. In certain embodiments, the display unit 312 may only be able to display a narrower dynamic range of image intensity values than a complete range of intensity values sampled from a photographic scene, such as the dynamic range of a single HDR image, the total dynamic range sampled over a set of two or more images comprising a multiple exposure (e.g., an HDR image stack), or an image and/or image set captured to combine ambient illumination and strobe illumination (e.g., strobe illumination 350). In one embodiment, images comprising an image stack may be merged according to any technically feasible HDR blending technique to generate a synthetic image for display within dynamic range constraints of the display unit 312. In one embodiment, the limited dynamic range of display unit 312 may specify an eight-bit per color channel binary representation of corresponding color intensities. In other embodiments, the limited dynamic range may specify more than eight-bits (e.g., 10 bits, 12 bits, or 14 bits, etc.) per color channel binary representation.

Figure 3B:
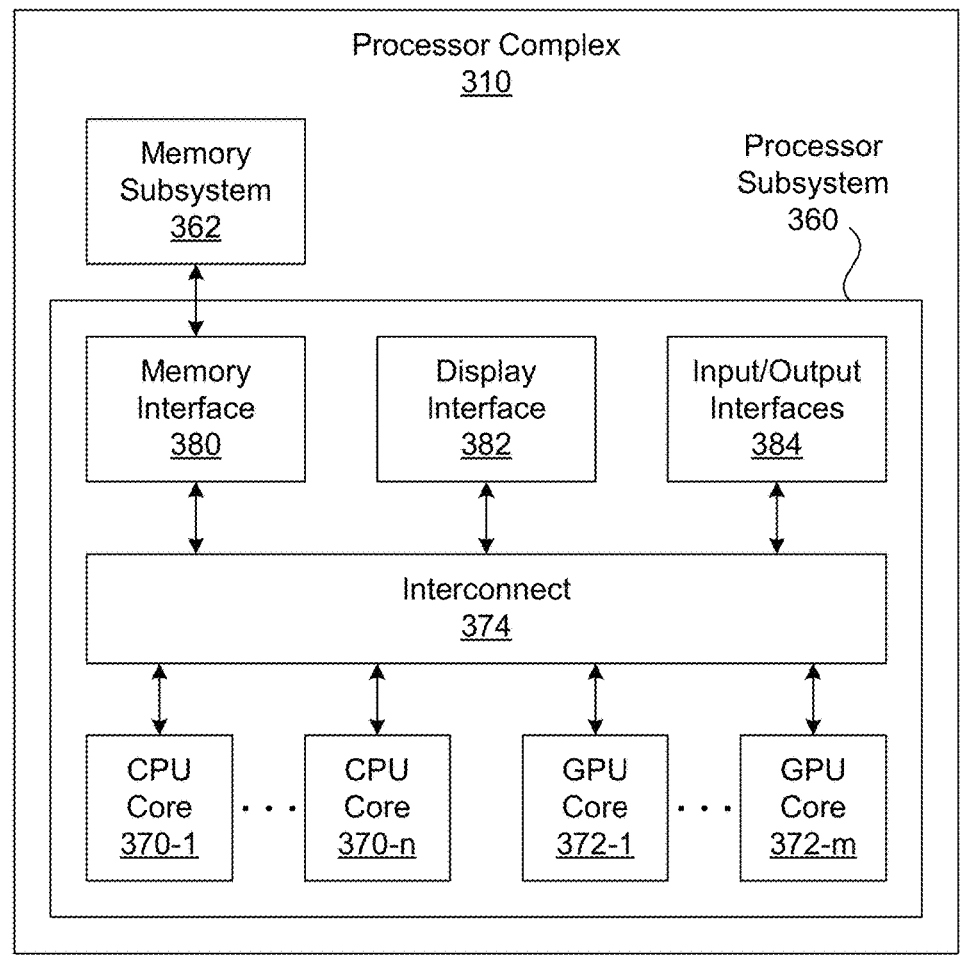
FIG. 3B illustrates a processor complex within the digital photographic system, according to one embodiment.

FIG. 3B illustrates a processor complex 310 within the digital photographic system 300 of FIG. 3A, in accordance with one embodiment. As an option, the processor complex 310 may be implemented in the context of the details of any of the Figures disclosed herein. Of course, however, the processor complex 310 may be implemented in any desired environment. Further, the aforementioned definitions may equally apply to the description below.

As shown, the processor complex 310 includes a processor subsystem 360 and may include a memory subsystem 362. In one embodiment, processor complex 310 may comprise a system on a chip (SoC) device that implements processor subsystem 360, and memory subsystem 362 comprises one or more DRAM devices coupled to the processor subsystem 360. In another embodiment, the processor complex 310 may comprise a multi-chip module (MCM) encapsulating the SoC device and the one or more DRAM devices comprising the memory subsystem 362.

The processor subsystem 360 may include, without limitation, one or more central processing unit (CPU) cores 370, a memory interface 380, input/output interfaces unit 384, and a display interface unit 382, each coupled to an interconnect 374. The one or more CPU cores 370 may be configured to execute instructions residing within the memory subsystem 362, volatile memory 318, NV memory 316, or any combination thereof. Each of the one or more CPU cores 370 may be configured to retrieve and store data through interconnect 374 and the memory interface 380. In one embodiment, each of the one or more CPU cores 370 may include a data cache, and an instruction cache. Additionally, two or more of the CPU cores 370 may share a data cache, an instruction cache, or any combination thereof. In one embodiment, a cache hierarchy is implemented to provide each CPU core 370 with a private cache layer, and a shared cache layer.

In some embodiments, processor subsystem 360 may include one or more graphics processing unit (GPU) cores 372. Each GPU core 372 may comprise a plurality of multi-threaded execution units that may be programmed to implement, without limitation, graphics acceleration functions. In various embodiments, the GPU cores 372 may be configured to execute multiple thread programs according to well-known standards (e.g. OpenGL™, WebGL™, OpenCL™, CUDA™, etc.), and/or any other programmable rendering graphic standard. In certain embodiments, at least one GPU core 372 implements at least a portion of a motion estimation function, such as a well-known Harris detector or a well-known Hessian-Laplace detector. Such a motion estimation function may be used at least in part to align images or portions of images within an image stack. For example, in one embodiment, an HDR image may be compiled based on an image stack, where two or more images are first aligned prior to compiling the HDR image. In another example, the motion estimation function may be used to stabilize video frames, either during real-time recording/previews or post-capture.

As shown, the interconnect 374 is configured to transmit data between and among the memory interface 380, the display interface unit 382, the input/output interfaces unit 384, the CPU cores 370, and the GPU cores 372. In various embodiments, the interconnect 374 may implement one or more buses, one or more rings, a cross-bar, a mesh, or any other technically feasible data transmission structure or technique. The memory interface 380 is configured to couple the memory subsystem 362 to the interconnect 374. The memory interface 380 may also couple NV memory 316, volatile memory 318, or any combination thereof to the interconnect 374. The display interface unit 382 may be configured to couple a display unit 312 to the interconnect 374. The display interface unit 382 may implement certain frame buffer functions (e.g. frame refresh, etc.). Alternatively, in another embodiment, the display unit 312 may implement certain frame buffer functions (e.g. frame refresh, etc.). The input/output interfaces unit 384 may be configured to couple various input/output devices to the interconnect 374.

In certain embodiments, a camera module 330 is configured to store exposure parameters for sampling each image associated with an image stack. For example, in one embodiment, when directed to sample a photographic scene, the camera module 330 may sample a set of images comprising the image stack according to stored exposure parameters. A software module comprising programming instructions executing within a processor complex 310 may generate and store the exposure parameters prior to directing the camera module 330 to sample the image stack. In other embodiments, the camera module 330 may be used to meter an image or an image stack, and the software module comprising programming instructions executing within a processor complex 310 may generate and store metering parameters prior to directing the camera module 330 to capture the image. Of course, the camera module 330 may be used in any manner in combination with the processor complex 310.

In one embodiment, exposure parameters associated with images comprising the image stack may be stored within an exposure parameter data structure that includes exposure parameters for one or more images. In another embodiment, a camera interface unit (not shown in FIG. 3B) within the processor complex 310 may be configured to read exposure parameters from the exposure parameter data structure and to transmit associated exposure parameters to the camera module 330 in preparation of sampling a photographic scene. After the camera module 330 is configured according to the exposure parameters, the camera interface may direct the camera module 330 to sample the photographic scene; the camera module 330 may then generate a corresponding image stack. The exposure parameter data structure may be stored within the camera interface unit, a memory circuit within the processor complex 310, volatile memory 318, NV memory 316, the camera module 330, or within any other technically feasible memory circuit. Further, in another embodiment, a software module executing within processor complex 310 may generate and store the exposure parameter data structure.

Figure 3C:
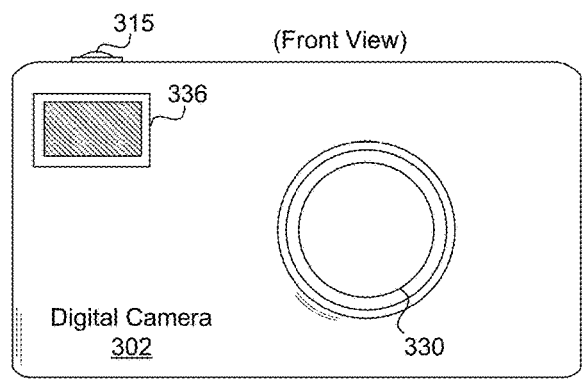
FIG. 3C illustrates a digital camera, in accordance with an embodiment.

FIG. 3C illustrates a digital camera 302, in accordance with one embodiment. As an option, the digital camera 302 may be implemented in the context of the details of any of the Figures disclosed herein. Of course, however, the digital camera 302 may be implemented in any desired environment. Further, the aforementioned definitions may equally apply to the description below.

In one embodiment, the digital camera 302 may be configured to include a digital photographic system, such as digital photographic system 300 of FIG. 3A. As shown, the digital camera 302 includes a camera module 330, which may include optical elements configured to focus optical scene information representing a photographic scene onto an image sensor, which may be configured to convert the optical scene information to an electronic representation of the photographic scene.

Additionally, the digital camera 302 may include a strobe unit 336, and may include a shutter release button 315 for triggering a photographic sample event, whereby digital camera 302 samples one or more images comprising the electronic representation. In other embodiments, any other technically feasible shutter release mechanism may trigger the photographic sample event (e.g. such as a timer trigger or remote control trigger, etc.).

Figure 3D:
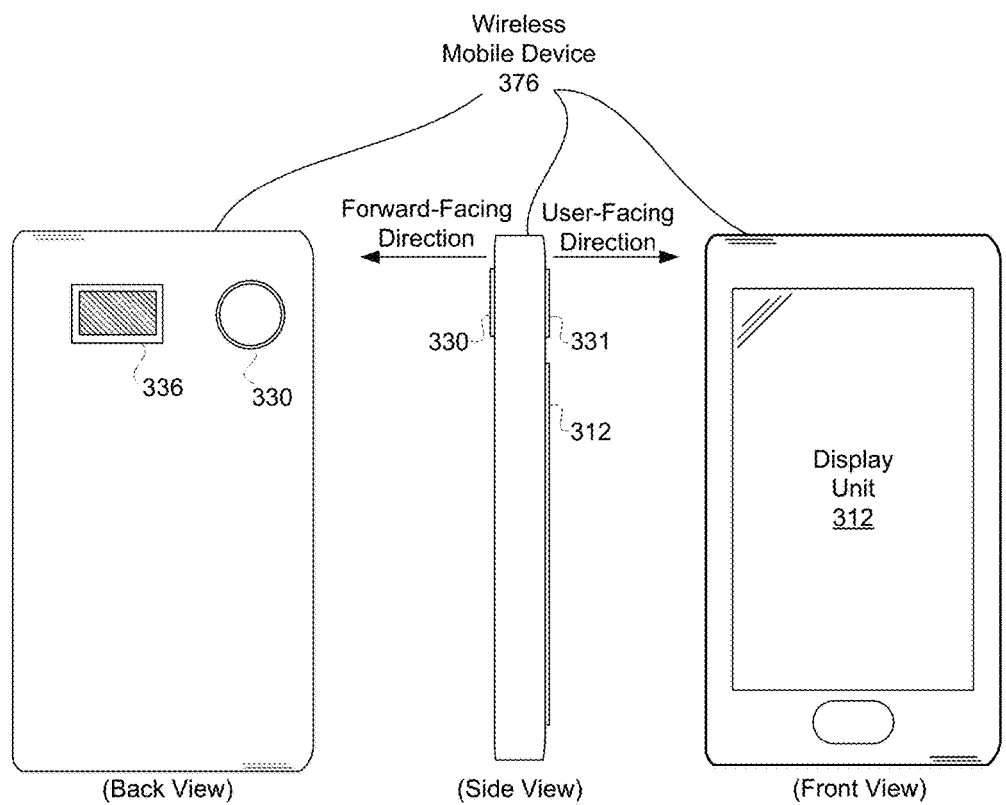
FIG. 3D illustrates a wireless mobile device, in accordance with another embodiment.

FIG. 3D illustrates a wireless mobile device 376, in accordance with one embodiment. As an option, the mobile device 376 may be implemented in the context of the details of any of the Figures disclosed herein. Of course, however, the mobile device 376 may be implemented in any desired environment. Further, the aforementioned definitions may equally apply to the description below.

In one embodiment, the mobile device 376 may be configured to include a digital photographic system (e.g. such as digital photographic system 300 of FIG. 3A), which is configured to sample a photographic scene. In various embodiments, a camera module 330 may include optical elements configured to focus optical scene information representing the photographic scene onto an image sensor, which may be configured to convert the optical scene information to an electronic representation of the photographic scene. Further, a shutter release command may be generated through any technically feasible mechanism, such as a virtual button, which may be activated by a touch gesture on a touch entry display system comprising display unit 312, or a physical button, which may be located on any face or surface of the mobile device 376. Of course, in other embodiments, any number of other buttons, external inputs/outputs, or digital inputs/outputs may be included on the mobile device 376, and which may be used in conjunction with the camera module 330.

As shown, in one embodiment, a touch entry display system comprising display unit 312 is disposed on the opposite side of mobile device 376 from camera module 330. In certain embodiments, the mobile device 376 includes a user-facing camera module 331 and may include a user-facing strobe unit (not shown). Of course, in other embodiments, the mobile device 376 may include any number of user-facing camera modules or rear-facing camera modules, as well as any number of user-facing strobe units or rear-facing strobe units.

In some embodiments, the digital camera 302 and the mobile device 376 may each generate and store a synthetic image based on an image stack sampled by camera module 330. The image stack may include one or more images sampled under ambient lighting conditions, one or more images sampled under strobe illumination from strobe unit 336, one or more images sampled under an accumulated exposure of both ambient and strobe illumination, or a combination thereof.

Figure 3E:
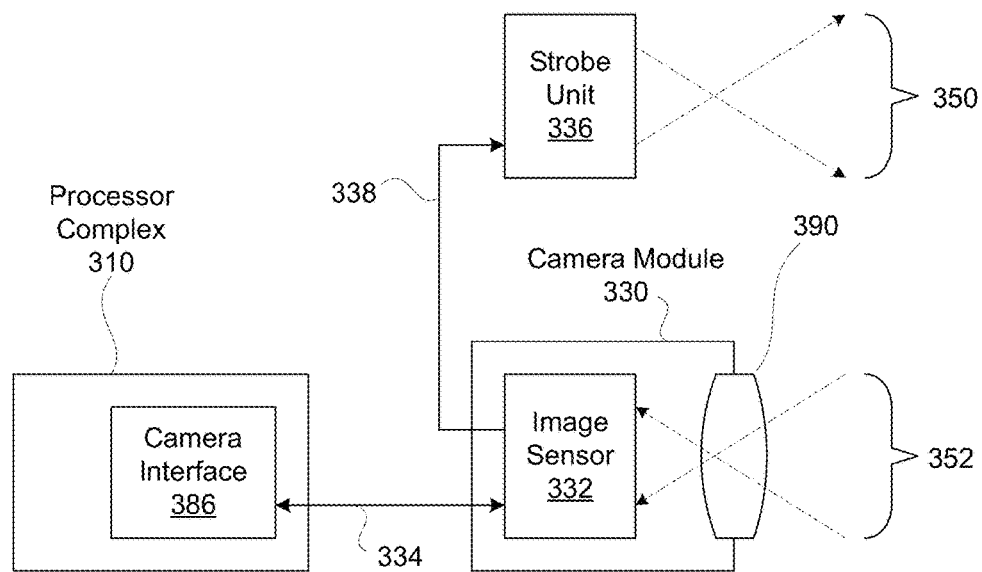
FIG. 3E illustrates a camera module configured to sample an image, according to one embodiment.

FIG. 3E illustrates camera module 330, in accordance with one embodiment. As an option, the camera module 330 may be implemented in the context of the details of any of the Figures disclosed herein. Of course, however, the camera module 330 may be implemented in any desired environment. Further, the aforementioned definitions may equally apply to the description below.

In one embodiment, the camera module 330 may be configured to control strobe unit 336 through strobe control signal 338. As shown, a lens 390 is configured to focus optical scene information 352 onto image sensor 332 to be sampled. In one embodiment, image sensor 332 advantageously controls detailed timing of the strobe unit 336 though the strobe control signal 338 to reduce inter-sample time between an image sampled with the strobe unit 336 enabled, and an image sampled with the strobe unit 336 disabled. For example, the image sensor 332 may enable the strobe unit 336 to emit strobe illumination 350 less than one microsecond (or any desired length) after image sensor 332 completes an exposure time associated with sampling an ambient image and prior to sampling a strobe image.

In other embodiments, the strobe illumination 350 may be configured based on a desired one or more target points. For example, in one embodiment, the strobe illumination 350 may light up an object in the foreground, and depending on the length of exposure time, may also light up an object in the background of the image. In one embodiment, once the strobe unit 336 is enabled, the image sensor 332 may then immediately begin exposing a strobe image. The image sensor 332 may thus be able to directly control sampling operations, including enabling and disabling the strobe unit 336 associated with generating an image stack, which may comprise at least one image sampled with the strobe unit 336 disabled, and at least one image sampled with the strobe unit 336 either enabled or disabled. In one embodiment, data comprising the image stack sampled by the image sensor 332 is transmitted via interconnect 334 to a camera interface unit 386 within processor complex 310. In some embodiments, the camera module 330 may include an image sensor controller (e.g., controller 333 of FIG. 3G), which may be configured to generate the strobe control signal 338 in conjunction with controlling operation of the image sensor 332.

Figure 3F:
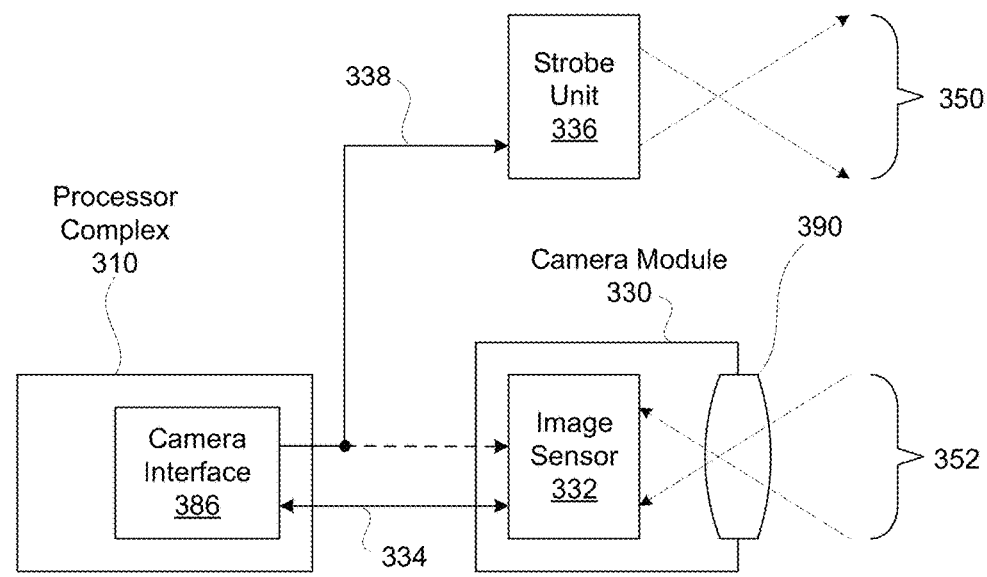
FIG. 3F illustrates a camera module configured to sample an image, according to another embodiment.

FIG. 3F illustrates a camera module 330, in accordance with one embodiment. As an option, the camera module 330 may be implemented in the context of the details of any of the Figures disclosed herein. Of course, however, the camera module 330 may be implemented in any desired environment. Further, the aforementioned definitions may equally apply to the description below.

In one embodiment, the camera module 330 may be configured to sample an image based on state information for strobe unit 336. The state information may include, without limitation, one or more strobe parameters (e.g. strobe intensity, strobe color, strobe time, etc.), for directing the strobe unit 336 to generate a specified intensity and/or color of the strobe illumination 350. In one embodiment, commands for configuring the state information associated with the strobe unit 336 may be transmitted through a strobe control signal 338, which may be monitored by the camera module 330 to detect when the strobe unit 336 is enabled. For example, in one embodiment, the camera module 330 may detect when the strobe unit 336 is enabled or disabled within a microsecond or less of the strobe unit 336 being enabled or disabled by the strobe control signal 338. To sample an image requiring strobe illumination, a camera interface unit 386 may enable the strobe unit 336 by sending an enable command through the strobe control signal 338. In one embodiment, the camera interface unit 386 may be included as an interface of input/output interfaces 384 in a processor subsystem 360 of the processor complex 310 of FIG. 3B. The enable command may comprise a signal level transition, a data packet, a register write, or any other technically feasible transmission of a command. The camera module 330 may sense that the strobe unit 336 is enabled and then cause image sensor 332 to sample one or more images requiring strobe illumination while the strobe unit 336 is enabled. In such an implementation, the image sensor 332 may be configured to wait for an enable signal destined for the strobe unit 336 as a trigger signal to begin sampling a new exposure.

In one embodiment, camera interface unit 386 may transmit exposure parameters and commands to camera module 330 through interconnect 334. In certain embodiments, the camera interface unit 386 may be configured to directly control strobe unit 336 by transmitting control commands to the strobe unit 336 through strobe control signal 338. By directly controlling both the camera module 330 and the strobe unit 336, the camera interface unit 386 may cause the camera module 330 and the strobe unit 336 to perform their respective operations in precise time synchronization. In one embodiment, precise time synchronization may be less than five hundred microseconds of event timing error. Additionally, event timing error may be a difference in time from an intended event occurrence to the time of a corresponding actual event occurrence.

In another embodiment, camera interface unit 386 may be configured to accumulate statistics while receiving image data from camera module 330. In particular, the camera interface unit 386 may accumulate exposure statistics for a given image while receiving image data for the image through interconnect 334. Exposure statistics may include, without limitation, one or more of an intensity histogram, a count of over-exposed pixels, a count of under-exposed pixels, an intensity-weighted sum of pixel intensity, or any combination thereof. The camera interface unit 386 may present the exposure statistics as memory-mapped storage locations within a physical or virtual address space defined by a processor, such as one or more of CPU cores 370, within processor complex 310. In one embodiment, exposure statistics reside in storage circuits that are mapped into a memory-mapped register space, which may be accessed through the interconnect 334. In other embodiments, the exposure statistics are transmitted in conjunction with transmitting pixel data for a captured image. For example, the exposure statistics for a given image may be transmitted as in-line data, following transmission of pixel intensity data for the captured image. Exposure statistics may be calculated, stored, or cached within the camera interface unit 386. In other embodiments, an image sensor controller within camera module 330 is configured to accumulate the exposure statistics and transmit the exposure statistics to processor complex 310, such as by way of camera interface unit 386. In one embodiments, the exposure statistics are accumulated within the camera module 330 and transmitted to the camera interface unit 386, either in conjunction with transmitting image data to the camera interface unit 386, or separately from transmitting image data.

In one embodiment, camera interface unit 386 may accumulate color statistics for estimating scene white-balance. Any technically feasible color statistics may be accumulated for estimating white balance, such as a sum of intensities for different color channels comprising red, green, and blue color channels. The sum of color channel intensities may then be used to perform a white-balance color correction on an associated image, according to a white-balance model such as a gray-world white-balance model. In other embodiments, curve-fitting statistics are accumulated for a linear or a quadratic curve fit used for implementing white-balance correction on an image. As with the exposure statistics, the color statistics may be presented as memory-mapped storage locations within processor complex 310. In one embodiment, the color statistics are mapped in a memory-mapped register space, which may be accessed through interconnect 334. In other embodiments, the color statistics may be transmitted in conjunction with transmitting pixel data for a captured image. For example, in one embodiment, the color statistics for a given image may be transmitted as in-line data, following transmission of pixel intensity data for the image. Color statistics may be calculated, stored, or cached within the camera interface 386. In other embodiments, the image sensor controller within camera module 330 is configured to accumulate the color statistics and transmit the color statistics to processor complex 310, such as by way of camera interface unit 386. In one embodiments, the color statistics are accumulated within the camera module 330 and transmitted to the camera interface unit 386, either in conjunction with transmitting image data to the camera interface unit 386, or separately from transmitting image data.

In one embodiment, camera interface unit 386 may accumulate spatial color statistics for performing color-matching between or among images, such as between or among an ambient image and one or more images sampled with strobe illumination. As with the exposure statistics, the spatial color statistics may be presented as memory-mapped storage locations within processor complex 310. In one embodiment, the spatial color statistics are mapped in a memory-mapped register space. In another embodiment the camera module is configured to accumulate the spatial color statistics, which may be accessed through interconnect 334. In other embodiments, the color statistics may be transmitted in conjunction with transmitting pixel data for a captured image. For example, in one embodiment, the color statistics for a given image may be transmitted as in-line data, following transmission of pixel intensity data for the image. Color statistics may be calculated, stored, or cached within the camera interface 386.

In one embodiment, camera module 330 may transmit strobe control signal 338 to strobe unit 336, enabling the strobe unit 336 to generate illumination while the camera module 330 is sampling an image. In another embodiment, camera module 330 may sample an image illuminated by strobe unit 336 upon receiving an indication signal from camera interface unit 386 that the strobe unit 336 is enabled. In yet another embodiment, camera module 330 may sample an image illuminated by strobe unit 336 upon detecting strobe illumination within a photographic scene via a rapid rise in scene illumination. In one embodiment, a rapid rise in scene illumination may include at least a rate of increasing intensity consistent with that of enabling strobe unit 336. In still yet another embodiment, camera module 330 may enable strobe unit 336 to generate strobe illumination while sampling one image, and disable the strobe unit 336 while sampling a different image.

Figure 3G:
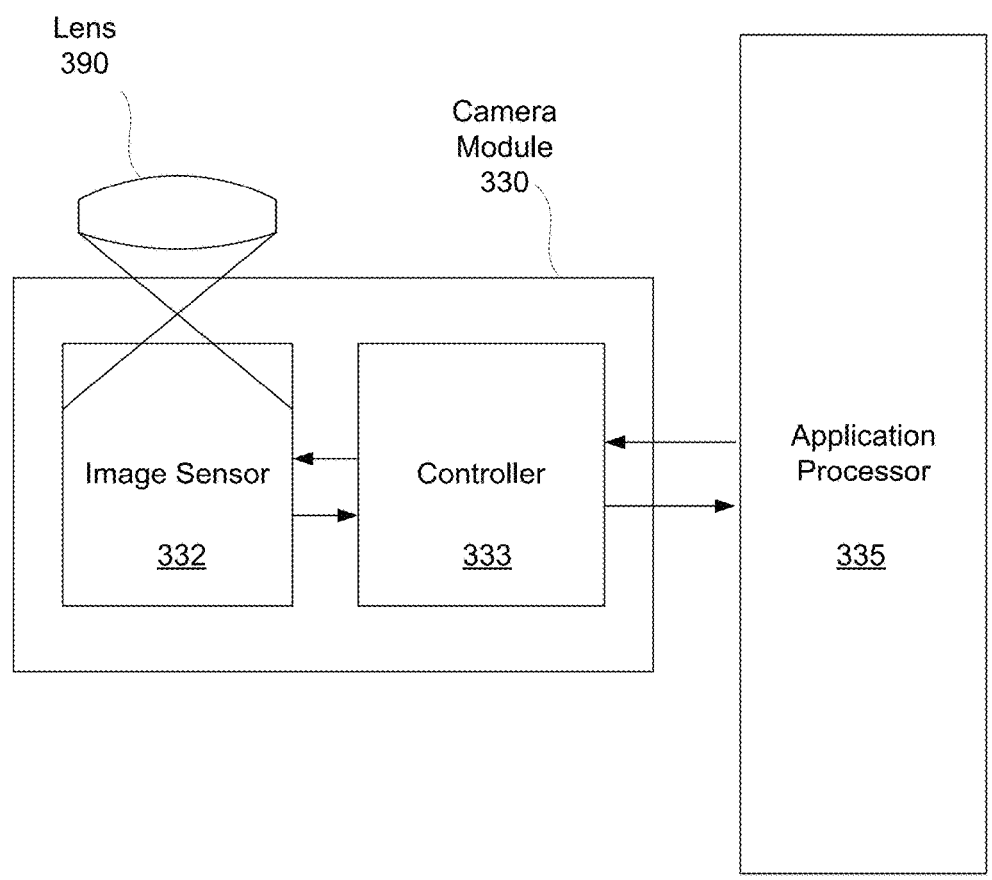
FIG. 3G illustrates a camera module in communication with an application processor, in accordance with an embodiment.

FIG. 3G illustrates camera module 330, in accordance with one embodiment. As an option, the camera module 330 may be implemented in the context of the details of any of the Figures disclosed herein. Of course, however, the camera module 330 may be implemented in any desired environment. Further, the aforementioned definitions may equally apply to the description below.

In one embodiment, the camera module 330 may be in communication with an application processor 335. The camera module 330 is shown to include image sensor 332 in communication with a controller 333. Further, the controller 333 is shown to be in communication with the application processor 335.

In one embodiment, the application processor 335 may reside outside of the camera module 330. As shown, the lens 390 may be configured to focus optical scene information to be sampled onto image sensor 332. The optical scene information sampled by the image sensor 332 may then be communicated from the image sensor 332 to the controller 333 for at least one of subsequent processing and communication to the application processor 335. In another embodiment, the controller 333 may control storage of the optical scene information sampled by the image sensor 332, or storage of processed optical scene information.

In another embodiment, the controller 333 may enable a strobe unit to emit strobe illumination for a short time duration (e.g. less than ten milliseconds) after image sensor 332 completes an exposure time associated with sampling an ambient image. Further, the controller 333 may be configured to generate strobe control signal 338 in conjunction with controlling operation of the image sensor 332.

In one embodiment, the image sensor 332 may be a complementary metal oxide semiconductor (CMOS) sensor or a charge-coupled device (CCD) sensor. In another embodiment, the controller 333 and the image sensor 332 may be packaged together as an integrated system, multi-chip module, multi-chip stack, or integrated circuit. In yet another embodiment, the controller 333 and the image sensor 332 may comprise discrete packages. In one embodiment, the controller 333 may provide circuitry for receiving optical scene information from the image sensor 332, processing of the optical scene information, timing of various functionalities, and signaling associated with the application processor 335. Further, in another embodiment, the controller 333 may provide circuitry for control of one or more of exposure, shuttering, white balance, and gain adjustment. Processing of the optical scene information by the circuitry of the controller 333 may include one or more of gain application, amplification, and analog-to-digital conversion. After processing the optical scene information, the controller 333 may transmit corresponding digital pixel data, such as to the application processor 335.

In one embodiment, the application processor 335 may be implemented on processor complex 310 and at least one of volatile memory 318 and NV memory 316, or any other memory device and/or system. The application processor 335 may be previously configured for processing of received optical scene information or digital pixel data communicated from the camera module 330 to the application processor 335.

Figure 4:
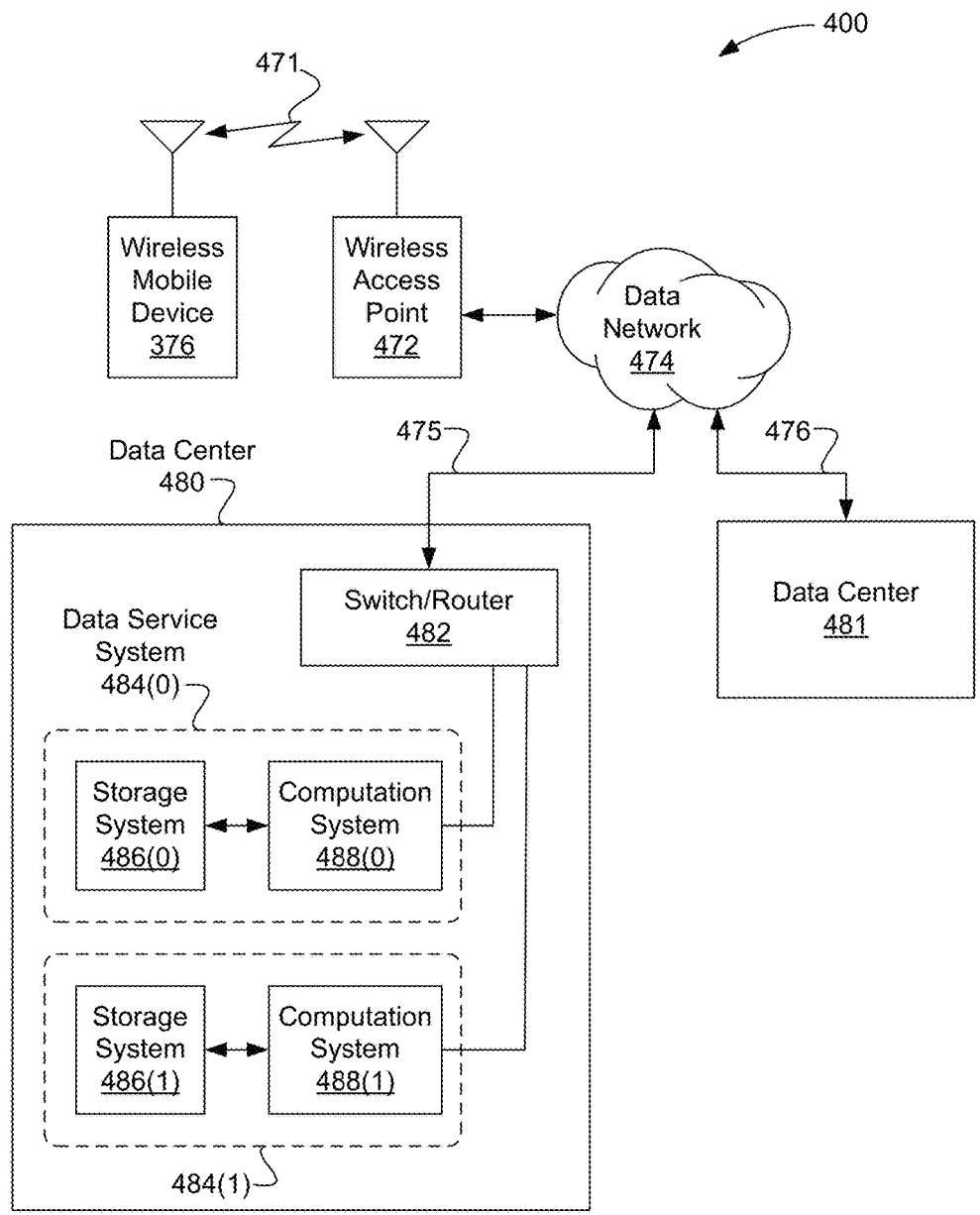
FIG. 4 illustrates a network service system, in accordance with another embodiment.

FIG. 4 illustrates a network service system 400, in accordance with one embodiment. As an option, the network service system 400 may be implemented in the context of the details of any of the Figures disclosed herein. Of course, however, the network service system 400 may be implemented in any desired environment. Further, the aforementioned definitions may equally apply to the description below.

In one embodiment, the network service system 400 may be configured to provide network access to a device implementing a digital photographic system. As shown, network service system 400 includes a wireless mobile device 376, a wireless access point 472, a data network 474, a data center 480, and a data center 481. The wireless mobile device 376 may communicate with the wireless access point 472 via a digital radio link 471 to send and receive digital data, including data associated with digital images. The wireless mobile device 376 and the wireless access point 472 may implement any technically feasible transmission techniques for transmitting digital data via digital radio link 471 without departing the scope and spirit of the present invention. In certain embodiments, one or more of data centers 480, 481 may be implemented using virtual constructs so that each system and subsystem within a given data center 480, 481 may comprise virtual machines configured to perform data processing and network data transmission tasks. In other implementations, one or more of data centers 480, 481 may be physically distributed over a plurality of physical sites.

The wireless mobile device 376 may comprise a smart phone configured to include a digital camera, a digital camera configured to include wireless network connectivity, a reality augmentation device, a laptop configured to include a digital camera and wireless network connectivity, or any other technically feasible computing device configured to include a digital photographic system and wireless network connectivity.

In various embodiments, the wireless access point 472 may be configured to communicate with wireless mobile device 376 via the digital radio link 471 and to communicate with the data network 474 via any technically feasible transmission media, such as any electrical, optical, or radio transmission media. For example, in one embodiment, wireless access point 472 may communicate with data network 474 through an optical fiber coupled to the wireless access point 472 and to a router system or a switch system within the data network 474. A network link 475, such as a wide area network (WAN) link, may be configured to transmit data between the data network 474 and the data center 480.

In one embodiment, the data network 474 may include routers, switches, long-haul transmission systems, provisioning systems, authorization systems, and any technically feasible combination of communications and operations subsystems configured to convey data between network endpoints, such as between the wireless access point 472 and the data center 480. In one implementation scenario, wireless mobile device 376 may comprise one of a plurality of wireless mobile devices configured to communicate with the data center 480 via one or more wireless access points coupled to the data network 474.

Additionally, in various embodiments, the data center 480 may include, without limitation, a switch/router 482 and at least one data service system 484. The switch/router 482 may be configured to forward data traffic between and among a network link 475, and each data service system 484. The switch/router 482 may implement any technically feasible transmission techniques, such as Ethernet media layer transmission, layer 2 switching, layer 3 routing, and the like. The switch/router 482 may comprise one or more individual systems configured to transmit data between the data service systems 484 and the data network 474.

In one embodiment, the switch/router 482 may implement session-level load balancing among a plurality of data service systems 484. Each data service system 484 may include at least one computation system 488 and may also include one or more storage systems 486. Each computation system 488 may comprise one or more processing units, such as a central processing unit, a graphics processing unit, or any combination thereof. A given data service system 484 may be implemented as a physical system comprising one or more physically distinct systems configured to operate together. Alternatively, a given data service system 484 may be implemented as a virtual system comprising one or more virtual systems executing on an arbitrary physical system. In certain scenarios, the data network 474 may be configured to transmit data between the data center 480 and another data center 481, such as through a network link 476.

In another embodiment, the network service system 400 may include any networked mobile devices configured to implement one or more embodiments of the present invention. For example, in some embodiments, a peer-to-peer network, such as an ad-hoc wireless network, may be established between two different wireless mobile devices. In such embodiments, digital image data may be transmitted between the two wireless mobile devices without having to send the digital image data to a data center 480.

Figure 5:
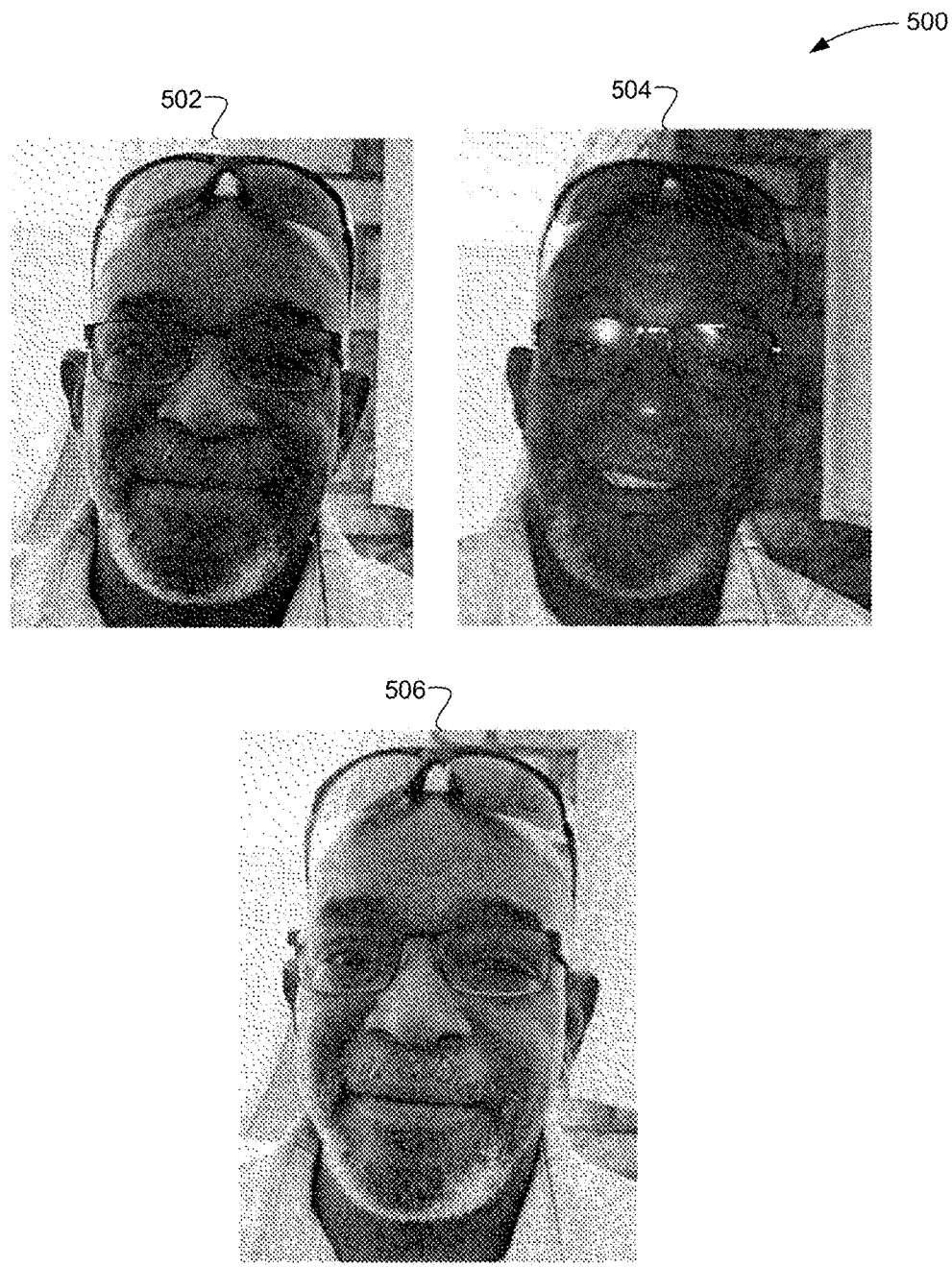
FIG. 5 illustrates capturing an image with correct skin tone exposure, in accordance with another embodiment.

FIG. 5 illustrates capturing 500 an image with correct skin tone exposure, in accordance with one embodiment. As an option, the capturing 500 may be implemented in the context of any one or more of the embodiments set forth in any previous and/or subsequent figure(s) and/or description thereof. Of course, however, the capturing 500 may be implemented in the context of any desired environment. Further, the aforementioned definitions may equally apply to the description below.

As shown, image 502 represents a conventional captured image using standard exposure and capture techniques. As can be seen, portions of image 502 lack sufficient contrast, making the subject's facial features difficult to distinguish. Image 504 represents a conventional flash captured image using standard exposure and flash capture technique. As shown in image 504, turning on the flash aggravates a lack of contrast, making the subject's facial features even more difficult to distinguish. In contrast, image 506 represents one or more techniques described herein, wherein such techniques provide improved image quality for portraits of individuals with very dark skin tone or very light skin tone. In particular, image 506 was captured according to method 100 of FIG. 1A, where a face was detected in the scene, and the face was determined to have a threshold dark skin tone. Having detected the face with threshold skin tone, the camera was configured to capture an HDR image, where default camera behavior would have captured a non-HDR image. The HDR image was tone-mapped and equalized according to CLAHE techniques to generate image 506.

Figure 6:
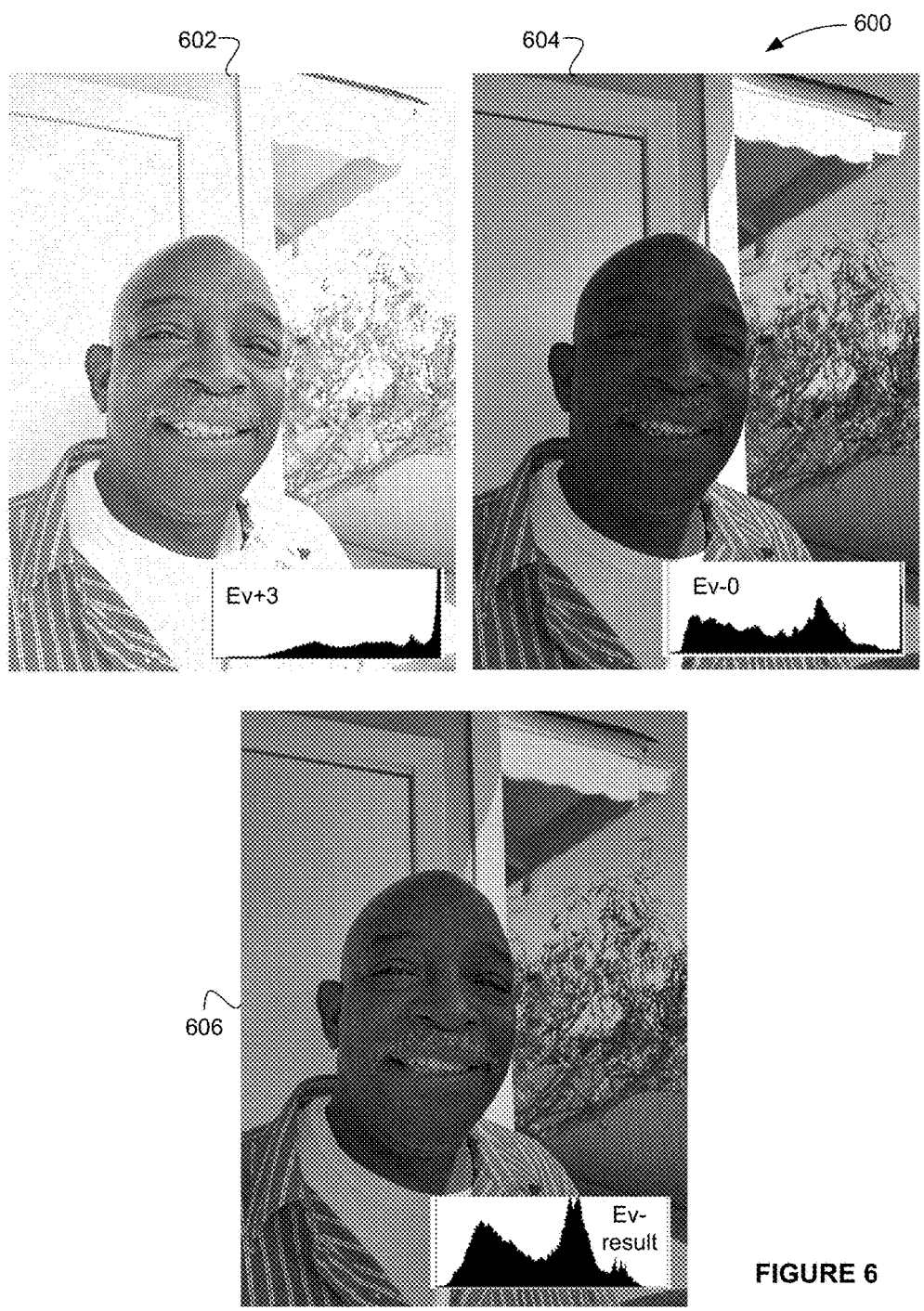
FIG. 6 illustrates capturing an image with correct skin tone exposure, in accordance with another embodiment.

FIG. 6 illustrates capturing 600 an image with correct skin tone exposure, in accordance with one embodiment. As an option, the capturing 600 may be implemented in the context of any one or more of the embodiments set forth in any previous and/or subsequent figure(s) and/or description thereof. Of course, however, the capturing 600 may be implemented in the context of any desired environment. Further, the aforementioned definitions may equally apply to the description below.

As shown, image 602 represents a conventional captured image at EV+3. As visually apparent and indicated by the accompanying histogram, image 602 is "blown out" and generally over-exposed (note the large spike on the far right side of the histogram). However, image 602 does include useful visual detail in the region of the subject's face, despite such detail appearing incorrectly over exposed. Image 604 represents a conventional captured image at EV-0. As visually apparent, image 602 balances overall image exposure, the goal of conventional exposure; however, as a consequence, there is insufficient visual detail or contrast captured in the region of the subject's face. The accompanying histogram is centered, with no excessively dark regions and only a narrow spike of excessively bright pixels. As such, image 604 meets conventional goals of balanced exposure, despite the subject's face lacking sufficient visual detail. Image 602 and image 604 both fail to capture important visual detail in different regions, with image 604 failing to capture visual detail in the region of the subject's face and image 602 failing to capture visual detail surrounding the subject's face. In contrast, image 606 provides visual detail while preserving a natural exposure appearance (e.g., correct exposure) in the region of the subjects face, and furthermore provides visual detail in regions surrounding the subject's face. In the histogram accompanying image 606, three clusters of pixel values are apparent. A leftmost cluster is associated with the region of the subject's face and some background regions. This cluster has a higher peak and breadth than that of image 604 or image 602, indicating greater detail in this intensity range for image 606. Furthermore, a mid-range group associate mostly with surrounding regions has increased in magnitude and breadth, indicating greater detail in the mid range. Note that while there are a significant number of bright pixels (e.g., in the sky region) in the rightmost cluster, few overall pixels are actually saturated ("blown out"). Beyond the visual superiority of detail in image 606, the accompanying histogram objectively illustrates that image 606 provides more detail in appropriate intensity ranges. Image 606 was captured using one or more techniques described herein, wherein such techniques provide improved image quality for portraits of individuals with very dark skin tone (or very light skin tone). In particular, image 606 was captured according to method 120 of FIG. 2B, with a high degree of HDR effect applied, in conjunction with equalization, to pixels within the face region. In this manner, the lighting and visual detail of the captured image is corrected, both with respect to the environment (shown around the face), and the face skin tone of the subject.

Figure 7:
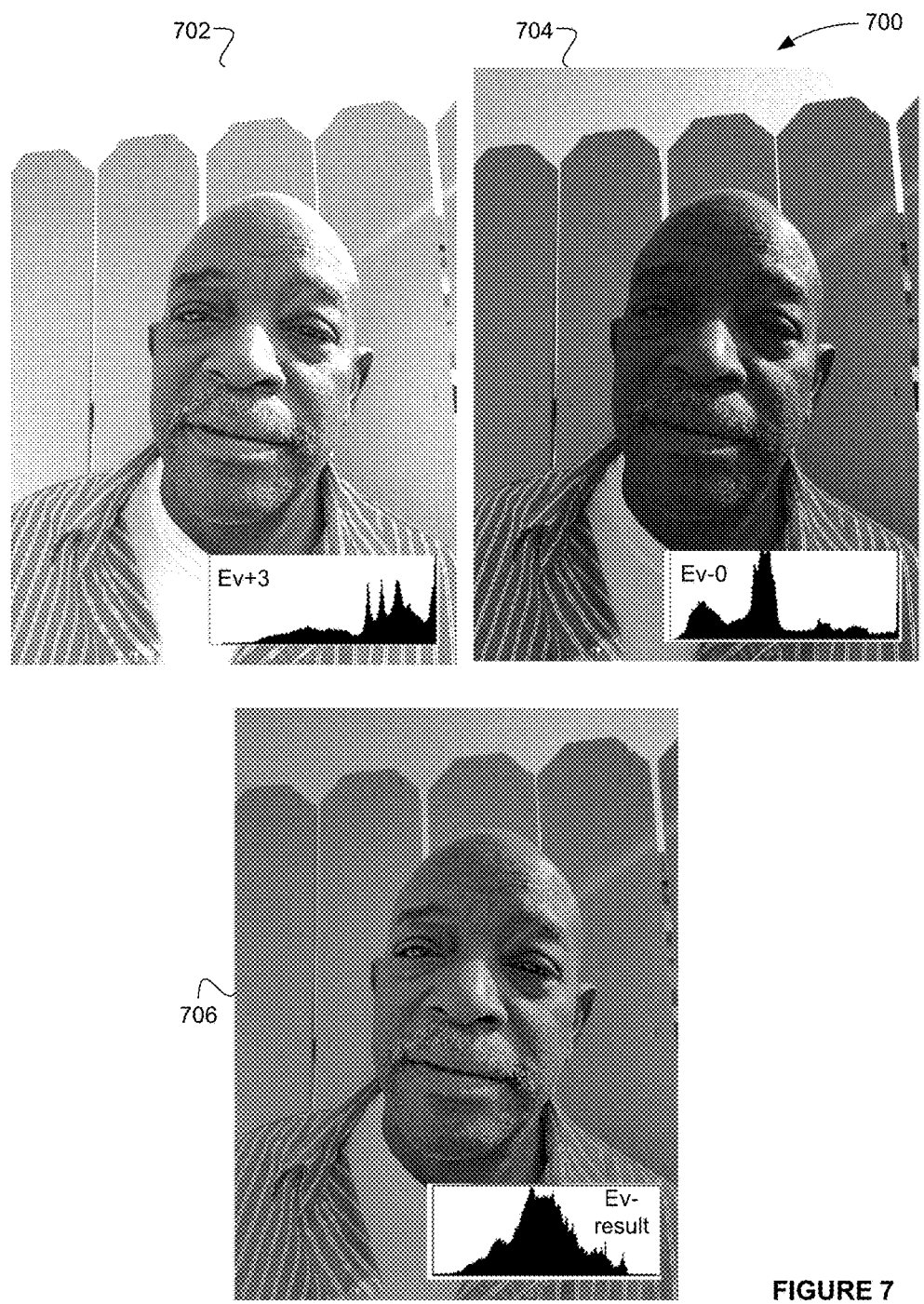
FIG. 7 illustrates capturing an image with correct skin tone exposure, in accordance with another embodiment.

FIG. 7 illustrates capturing 700 an image with correct skin tone exposure, in accordance with one embodiment. As an option, the capturing 700 may be implemented in the context of any one or more of the embodiments set forth in any previous and/or subsequent figure(s) and/or description thereof. Of course, however, the capturing 700 may be implemented in the context of any desired environment. Further, the aforementioned definitions may equally apply to the description below.

As shown, image 702 represents a conventional captured image at EV+3. As is visually apparent, image 702 is over exposed; furthermore, the accompanying histogram shows a large spike of saturated pixels at the far right. At this exposure level, useful visual detail is captured in the region of the subject's face. However, the subject appears unnaturally bright and over exposed. Image 704 represents a conventional captured image at EV-0. The histogram accompanying image 704 indicates conventionally proper exposure that would not cause a conventional camera system to select an HDR capture mode. Despite the conventionally proper exposure, the subject's face lacks visual detail. In contrast, image 706 was captured according to method 100 of FIG. 1A, where a face was detected in the scene, and the face was determined to have a threshold dark skin tone. Having detected the face with threshold skin tone, the camera was configured to capture an HDR image, where default camera behavior would have captured a non-HDR image. The HDR image was tone-mapped and equalized according to CLAHE techniques to generate image 706. In this manner, the lighting of the captured image is corrected, both respect to the environment (shown around the face), and the face skin tone.

Figure 8:
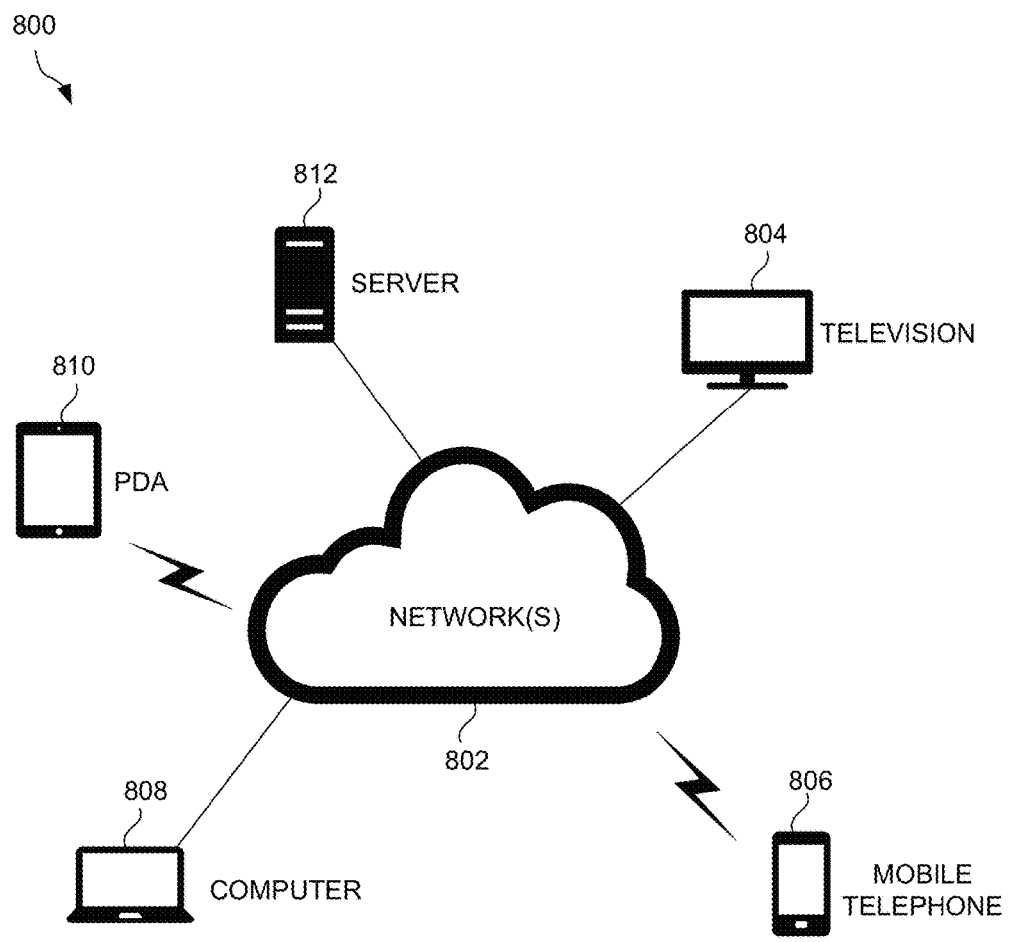
FIG. 8 illustrates a network architecture, in accordance with one possible embodiment.

FIG. 8 illustrates a network architecture 800, in accordance with one possible embodiment. As shown, at least one network 802 is provided. In the context of the present network architecture 800, the network 802 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 802 may be provided.

Coupled to the network 802 is a plurality of devices. For example, a server computer 812 and an end user computer 808 may be coupled to the network 802 for communication purposes. Such end user computer 808 may include a desktop computer, lap-top computer, and/or any other type of logic. Still yet, various other devices may be coupled to the network 802 including a personal digital assistant (PDA) device 810, a mobile phone device 806, a television 804, a camera 814, etc.

Figure 9:
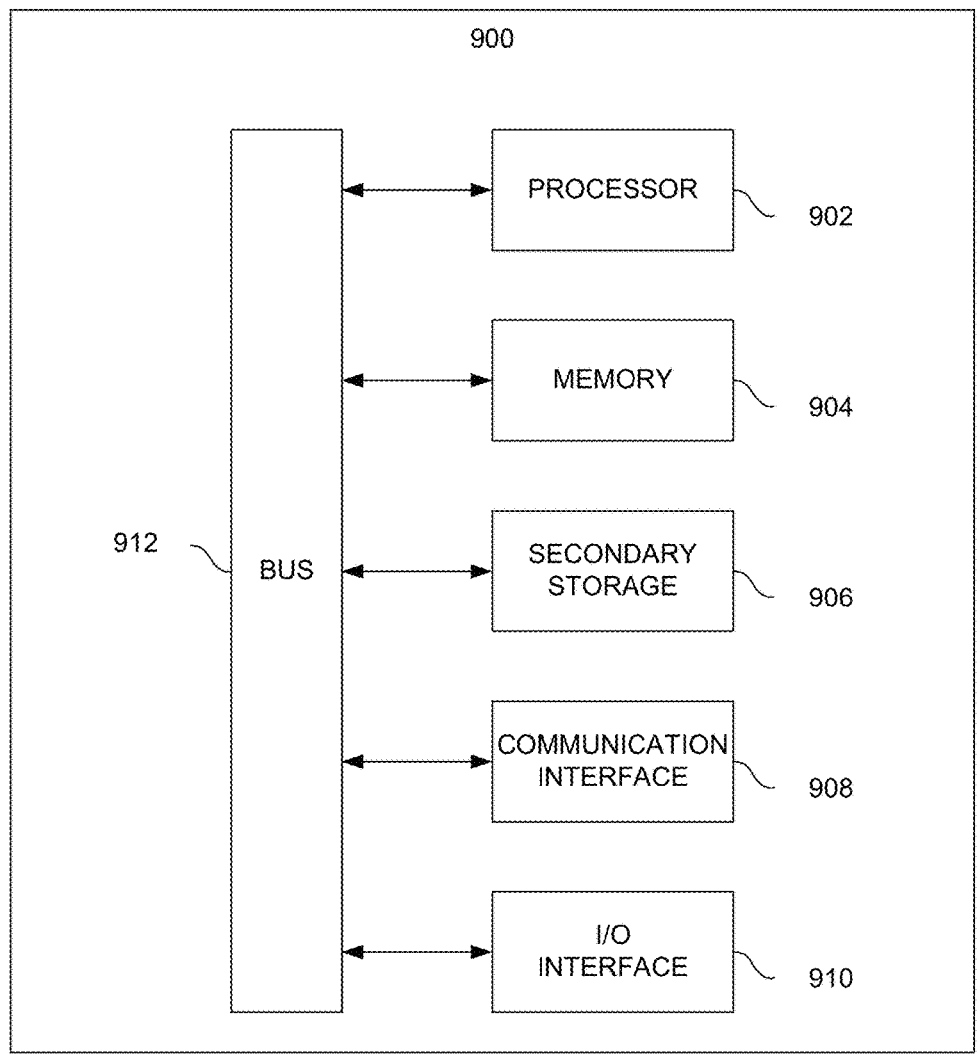
FIG. 9 illustrates an exemplary system, in accordance with one embodiment.

FIG. 9 illustrates an exemplary system 900, in accordance with one embodiment. As an option, the system 900 may be implemented in the context of any of the devices of the network architecture 800 of FIG. 8. Of course, the system 900 may be implemented in any desired environment.

As shown, a system 900 is provided including at least one central processor 902 which is connected to a communication bus 912. The system 900 also includes main memory 904 [e.g. random access memory (RAM), etc.]. The system 900 also includes a graphics processor 908 and a display 910.

The system 900 may also include a secondary storage 906. The secondary storage 906 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 904, the secondary storage 906, and/or any other memory, for that matter. Such computer programs, when executed, enable the system 900 to perform various functions (as set forth above, for example). Memory 904, storage 906 and/or any other storage are possible examples of non-transitory computer-readable media. In one embodiment, digital photographic system 300 includes system 900.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A device, comprising:
    a non-transitory memory storing instructions;
    a camera module; and
    one or more processors in communication with the non-transitory memory and the camera module, wherein the one or more processors execute the instructions to:
        detect one or more faces having threshold skin tone within a scene;
        based on the detected one or more faces, segment the scene into one or more face regions and one or more non-face regions;
        cause the camera module to capture two or more images of the scene, wherein a first image of the two or more images is exposed so that a median intensity of the one or more face regions defines a mid-point intensity of the first image, and a second image of the two or images is exposed so that a median intensity of the one or more non-face regions defines a mid-point intensity of the second image; and
        in response to the capture, process the one or more face regions to generate a final image.

2. The device of claim 1, wherein the threshold skin tone is a predefined average intensity or histogram median.

3. The device of claim 2, wherein the predefined average intensity or histogram median is based on the one or more face regions.

4. The device of claim 1, wherein the device is operable such that the two or more images include at least one high dynamic range (HDR) image.

5. The device of claim 1, wherein the device is operable such that the processing includes processing the one or more non-face regions and applying an HDR effect by blending, using a strength coefficient, the first image and the second image.

6. The device of claim 1, wherein the device is operable such that the capturing is of a video stream.

7. The device of claim 1, wherein the device is operable such that the processing includes applying a local equalization on pixels within the one or more face regions.

8. The device of claim 1, wherein the device is operable such that a model is constructed of one or more individuals depicted within the scene based on a depth map and at least one visual image.

9. The device of claim 8, wherein the depth map is used to construct a three-dimensional (3D) model of the one or more faces.

10. The device of claim 8, wherein the at least one visual image includes a surface texture.

11. The device of claim 10, wherein the surface texture includes one or more features associated with each of the one or more faces.

12. The device of claim 1, wherein the device is operable such that the segmenting includes a transition region between the one or more face regions and the one or more non-face regions.

13. The device of claim 1, wherein the device is operable such that the one or more face regions includes at least one of a depth map, and a texture map.

14. The device of claim 13, wherein the device is operable such that a lighting gradient is used to modify post-processing lighting conditions on the one or more faces.

15. The device of claim 1, wherein the device is operable to further execute the instructions to correct a color of light associated with skin tone associated with each of the one or more faces based on a measurement of an ambient lighting color balance.

16. The device of claim 1, wherein the device is operable to further execute the instructions to create a texture map which selectively modifies contrast of the scene to correct for skin tone associated with each of the one or more faces.

17. The device of claim 1, wherein the device is operable such that a histogram associated with the final image shows correct exposure data for the scene.

18. A computer-implemented method, comprising:
  detecting, using a processor, one or more faces having threshold skin tone within a scene;
  based on the detected one or more faces, segmenting, using the processor, the scene into one or more face regions and one or more non-face regions;
  capturing, using a camera, two or more images of the scene, wherein a first image of the two or more images is exposed so that a median intensity of the one or more face regions defines a mid-point intensity of the first image, and a second image of the two or images is exposed so that a median intensity of the one or more non-face regions defines a mid-point intensity of the second image; and
  in response to the capturing, processing, using the processor, the one or more face regions to generate a final image.

19. A computer program product comprising computer executable instructions stored on a non-transitory computer readable medium that when executed by a processor instruct the processor to:
  detect one or more faces having threshold skin tone within a scene;
  based on the detected one or more faces, segment the scene into one or more face regions and one or more non-face regions;
  cause a camera module to capture two or more images of the scene, wherein a first image of the two or more images is exposed so that a median intensity of the one or more face regions defines a mid-point intensity of the first image, and a second image of the two or images is exposed so that a median intensity of the one or more non-face regions defines a mid-point intensity of the second image; and
  in response to the capture, process the one or more face regions to generate a final image.

* * * * *